United States Patent
Akl et al.

(10) Patent No.: US 11,758,464 B2
(45) Date of Patent: Sep. 12, 2023

(54) MESH CONNECTIVITY IN INTEGRATED ACCESS AND BACKHAUL NETWORKS

(71) Applicant: QUALCOMM incorporated, San Diego, CA (US)

(72) Inventors: Naeem Akl, Somerville, NJ (US); Karl Georg Hampel, Hoboken, NJ (US); Sony Akkarakaran, Poway, CA (US); Navid Abedini, Basking Ridge, NJ (US); Junyi Li, Fairless Hills, PA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 240 days.

(21) Appl. No.: 17/329,994

(22) Filed: May 25, 2021

(65) Prior Publication Data
US 2022/0386219 A1    Dec. 1, 2022

(51) Int. Cl.
*H04W 40/24* (2009.01)
*H04W 40/22* (2009.01)
*H04W 84/18* (2009.01)

(52) U.S. Cl.
CPC .......... *H04W 40/24* (2013.01); *H04W 40/22* (2013.01); *H04W 84/18* (2013.01)

(58) Field of Classification Search
None
See application file for complete search history.

(56) References Cited

U.S. PATENT DOCUMENTS

| | | | | |
|---|---|---|---|---|
| 2020/0178097 | A1* | 6/2020 | Lee | H04W 24/08 |
| 2020/0374953 | A1* | 11/2020 | Majmundar | H04W 92/20 |
| 2021/0058826 | A1* | 2/2021 | Mao | H04W 28/0808 |
| 2022/0312529 | A1* | 9/2022 | Vangala | H04W 76/19 |

OTHER PUBLICATIONS

"3rd Generation Partnership Project, Technical Specification Group Radio Access Network, NR, Study on Integrated Access and Backhaul, (Release 16)", 3GPP Draft, 38874-G00, 38.874, V16.0.0 (Dec. 2018), 3rd Generation Partnership Project (3GPP), Mobile Competence Centre, 650, Route Des Lucioles, F-06921, Sophia-Antipolis Cedex, France, Jan. 11, 2019, XP051576885, Dec. 2018, 111 Pages.

(Continued)

*Primary Examiner* — Brian S Roberts
(74) *Attorney, Agent, or Firm* — Holland & Hart LLP

(57) ABSTRACT

Methods, systems, and devices for wireless communications are described that provide for mesh connectivity between integrated access and backhaul (IAB) nodes. A first node of an IAB network may determine a routing address for a second node, and communications may be transmitted to the second node based on the routing address to allow for coordination between the first and second nodes. The first node may detect a discovery signal of a second node, and may determine to communicate with the second node based on the discovery signal. The first node may obtain the routing address based on one or more of transmitting a request for the routing address to a third node, establishing a sidelink connection with the second node to obtain the routing address, receiving a mapping between routing addresses and cell IDs that are transmitted in discovery signals, or any combinations thereof.

29 Claims, 17 Drawing Sheets

(56) References Cited

OTHER PUBLICATIONS

Huawei: "Correction on the Identification of IAB-Donor-DU", 3GPP TSG-RAN WG3 Meeting #109-e, R3-205300, 3rd Generation Partnership Project (3GPP), Mobile Competence Centre, 650, Route Des Lucioles, F-06921 Sophia-Antipolis Cedex, France, vol. RAN WG3, No. Online, Aug. 17, 2020-Aug. 28, 2020, Aug. 7, 2020, XP051915966, 4 Pages.
International Search Report and Written Opinion—PCT/US2022/025107—ISA/EPO—dated Jul. 21, 2022.
Qualcomm Incorporated: "(TP for NR_IAB BL CR TS 38.401) Remaining Issues on Topology Discovery for IAB", 3GPP TSG-RAN WG3 Meeting #107bis-e, R3-201779, 3rd Generation Partnership Project (3GPP), Mobile Competence Centre, 650, Route Des Lucioles, F-06921 Sophia-Antipolis Cedex, France, vol. RAN WG3, No. Online Meeting, Apr. 20, 2020-Apr. 30, 2020, Apr. 9, 2020, XP051870524, 6 Pages.

\* cited by examiner

MESH CONNECTIVITY IN INTEGRATED ACCESS AND BACKHAUL NETWORKS

FIELD OF TECHNOLOGY

The following relates to wireless communications, including mesh connectivity in integrated access and backhaul networks.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some wireless communications systems (e.g., 5G new radio (NR) systems), network infrastructure and spectral resources may support access links for UEs served by the network and may additionally support wireless backhaul link capabilities in supplement to wireline backhaul connections, providing an integrated access and backhaul (IAB) network architecture. In such systems, one or more nodes (e.g., one or more base stations) may include centralized units (CUs) and distributed units (DUs) and may be referred to as donor nodes. IAB nodes may support mobile terminal (MT) functionality for access links with UEs. In IAB deployments, resource scheduling can become complex due to various factors, including varying loads at different nodes and neighboring cell interference, to name just two examples.

SUMMARY

The described techniques relate to improved methods, systems, devices, and apparatuses that support mesh connectivity in integrated access and backhaul (IAB) networks. In accordance with various aspects, described techniques provide for mesh connectivity between IAB nodes to provide for communications between IAB nodes. In some cases, communications between IAB nodes may allow for support of distributed algorithms for topology discovery, routing, load-balancing, resource coordination, or any combinations thereof, without involvement of a central unit (CU) of the IAB network.

In some cases, a first node of an IAB network may determine a routing address for a second node that is to be communicated with. The first node may detect a discovery signal of a second node, and may determine to communicate with the second node based on the discovery signal. In some cases, the first node may request the routing address from a third node of the IAB network. In other cases, the first node may establish a sidelink connection with the second node to obtain the routing address. In further cases, the first node may receive a mapping between routing addresses and cell IDs that are transmitted in discovery signals, and may determine the routing address for the second node based on the mapping. The first node may then transmit a message for communications coordination with the second node via a third node of the IAB network using the routing address.

DETAILED DESCRIPTION

Figure 1:
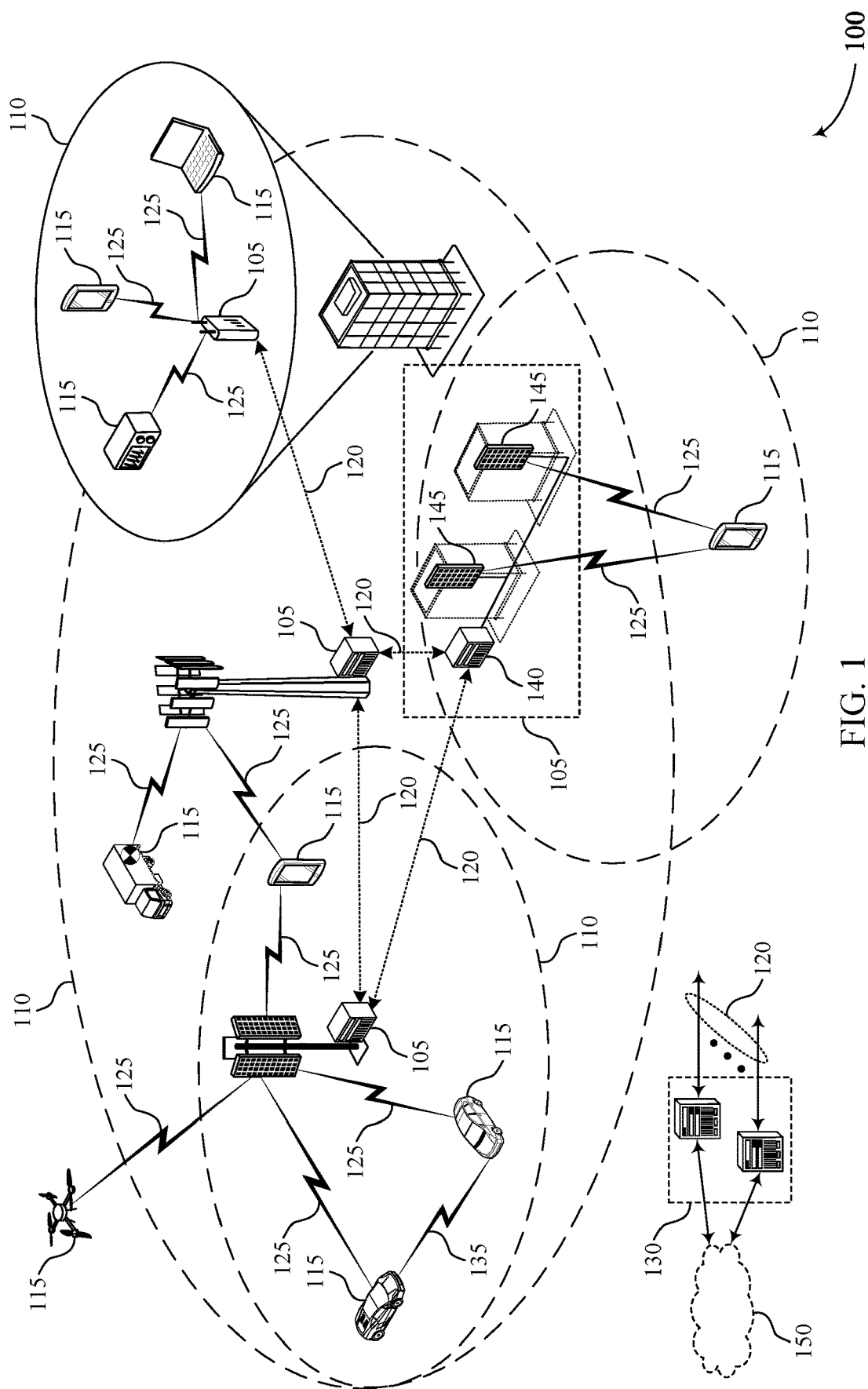
FIG. 1 illustrates an example of a wireless communications system that supports mesh connectivity in integrated access and backhaul networks in accordance with aspects of the present disclosure.

Some wireless communication systems may support a network, such as an integrated access and backhaul (IAB) network, that includes multiple nodes that provide backhaul connectivity through wireless backhaul connections and one or more wired backhaul links (e.g., fiber links). For example, an IAB network may be configured in which one or more donor nodes have a wireline connection with a core network and multiple IAB nodes may relay traffic to and from a donor node through one or multiple hops that may use wireless backhaul links. A donor node may include a central unit (CU) for controlling the network and one or more distributed units (DUs) that schedules one or more other nodes, such as child IAB nodes. The DUs at an IAB node may provide wireless access links to a user equipment (UE), wireless backhaul links to another IAB node (e.g., through a mobile termination (MT) at a child IAB node), or combinations thereof. Such IAB networks may thus provide for sharing of resources between access and backhaul.

In some cases, an IAB donor may include a CU and a DU, where the CU may provide configuration information for nodes of an IAB network and hold radio resource control (RRC) and packet data convergence protocol (PDCP) layer functions. The DU may act as a scheduling node that schedules child nodes of the IAB-donor, and the DU may hold radio link control (RLC), medium access control (MAC), and physical (PHY) layer functions. One or more other IAB-nodes of the IAB network may act as layer two (L2) relay nodes and may include MT and DU functions. The MT function may provide wireless termination of a link with a parent node as a scheduled node (e.g., similar to a UE) that is scheduled by its parent IAB node or IAB donor. The DU function may act as a scheduling node that schedules any child nodes of the IAB node.

When communicating between different nodes of an IAB network in existing systems, most functionality is centralized. For example, resource configuration, backhaul adaptation protocol (BAP) and quality of service (QoS) configuration, and topology adaptation may all be configured and controlled by the CU. Between IAB nodes, local coordination is restricted to child-parent communications, such as for scheduling or release of soft resources. Further, IAB backhaul transport is restricted to always-upstream (e.g., MT-to-DU, MT-to-DU, etc.) or always-downstream (e.g., DU-to-MT, DU-to-MT, etc.) and is not mixed. In accordance with various aspects of the present disclosure, mesh connectivity of IAB nodes may be implemented in which different IAB nodes, that are not in an upstream/downstream relationship, may communicate with each other. In some cases, IAB nodes may use BAP or internet protocol (IP) to communicate via one or more donor-DUs which may act as a first-hop router. Such IAB node communications may allow support for distributed algorithms for topology discovery, routing, load-balancing, resource coordination, interference management, or any combinations thereof, without CU involvement. Thus, such techniques may enhance network efficiency, reduce overhead associated with CU configurations or reconfigurations, allow for more efficient resource usage, and enhance network bandwidth and reliability.

In accordance with various techniques as discussed herein, IAB nodes may obtain information for routing communications to other IAB nodes, such as a routing address. In some cases, a first IAB node may detect a discovery signal of a second IAB node. Based on the discovery signal, the first IAB node may determine to communicate with the second IAB node. In some cases, the first IAB node may determine the routing address of the second IAB node by requesting the routing address from a third IAB node. In other cases, the first IAB node may establish a sidelink connection with the second IAB node to obtain the routing address. In other cases, the first IAB node may receive a mapping between routing addresses and cell IDs that are transmitted in the discovery signals, and the routing address of the second IAB node may be determined based on the received mapping. The first IAB node may then transmit a communication to the second IAB node via a different IAB node using the routing address. In some cases, the first IAB node and the second IAB node may be neighboring nodes, and the communications between the nodes may provide for resource coordination or interference management between the nodes, thereby helping to enhance efficiency and improve reliability of communications at each node. In some cases, communications between IAB nodes may allow for support of distributed algorithms for topology discovery, routing, load-balancing, resource coordination, or any combinations thereof, without involvement of a CU of the IAB network.

Although various aspects of the present disclosure are described with reference to an IAB network and related devices, units, or nodes, the techniques, processes, operations, methods, and apparatuses described herein are more broadly applicable to various networks, devices, units, and nodes in various wireless communication environments and the present disclosure should not be interpreted as limiting unless specifically noted.

Aspects of the disclosure are initially described in the context of wireless communications systems. Various exemplary IAB networks are illustrated and described along with techniques for connectivity between nodes. Aspects of the disclosure are further illustrated by and described with reference to apparatus diagrams, system diagrams, and flowcharts that relate to mesh connectivity in integrated access and backhaul networks.

FIG. 1 illustrates an example of a wireless communications system 100 that supports mesh connectivity in integrated access and backhaul networks in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MIME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

In some cases, one or more base stations 105, UEs 115, or combinations thereof may be configured as nodes in an IAB network. The IAB network may have multiple nodes, including one or more donor nodes and multiple IAB nodes. In some cases, communications between IAB nodes using mesh connectivity may allow for support of distributed algorithms for topology discovery, routing, load-balancing, resource coordination, interference management, or any combinations thereof, without involvement of a CU of the IAB network. In some cases, an IAB node may obtain a routing address for one or more other IAB nodes in accordance with techniques as discussed herein, such as illustrated and discussed with reference to FIGS. 2 through 6.

Figure 2:
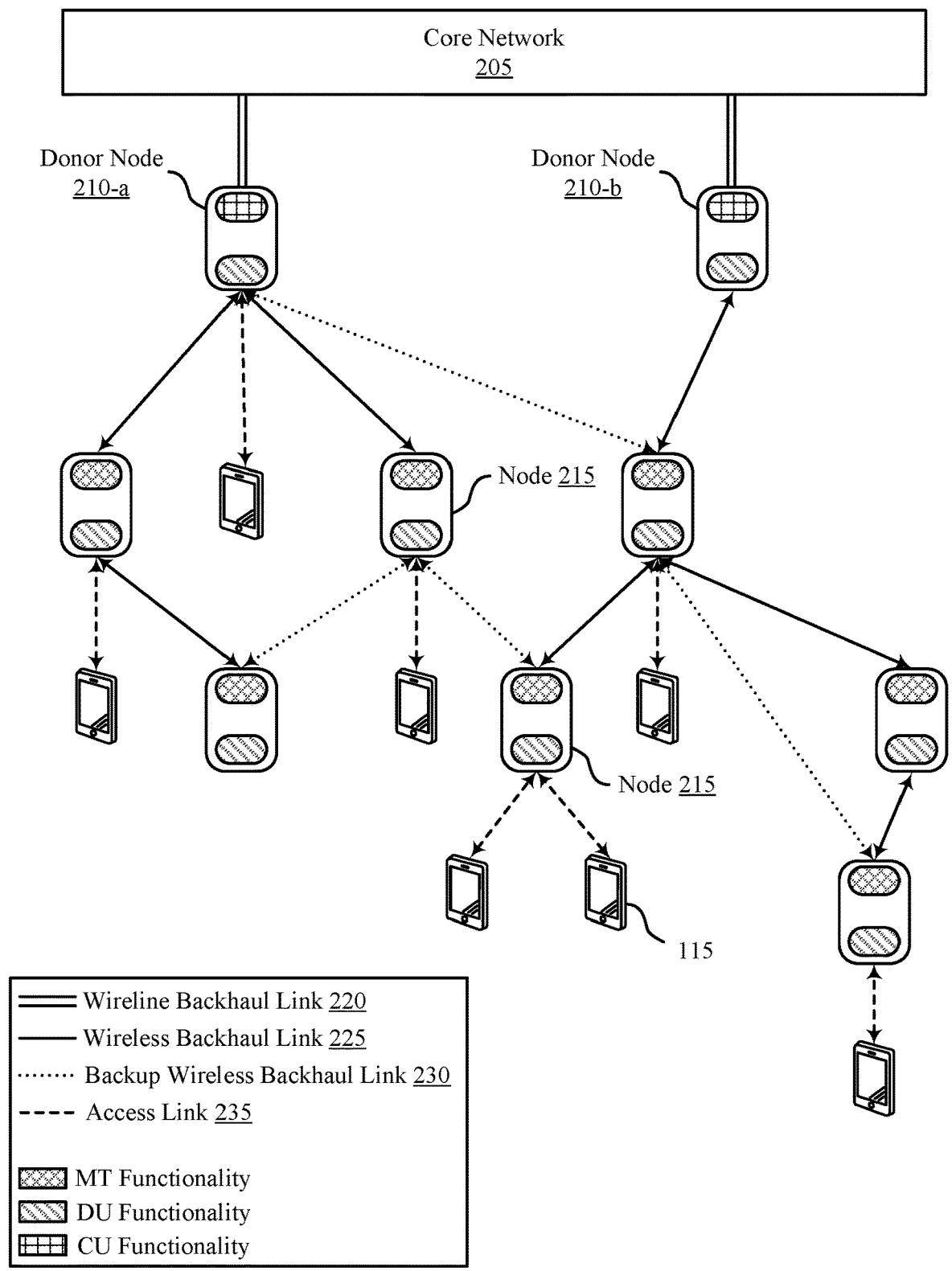
FIG. 2 illustrates an example of an integrated access and backhaul (IAB) network that supports mesh connectivity in accordance with aspects of the present disclosure.

FIG. 2 illustrates an example of an IAB network 200 that supports mesh connectivity in accordance with aspects of the present disclosure. IAB network 200 may supplement wireline backhaul connections (e.g., wireline backhaul links 220) by sharing infrastructure and spectral resources for network access with wireless backhaul link capabilities, in an IAB network architecture. IAB network 200 may include a core network 205 and one or more base stations or supported devices split into one or more support entities (i.e., functionalities) for promoting wireless backhaul density in collaboration with communication access. Aspects of the supporting functionalities of the base stations may be referred to as wireless nodes, such as donor nodes 210 and IAB nodes 215. IAB network 200 may additionally support a number of UEs 115, which may communicate on the uplink with one or more donor nodes 210, IAB nodes 215, or a combination of these devices. In some examples, IAB network 200 may implement aspects of wireless communications system 100.

IAB network 200 may include one or more donor nodes 210, which may interface between one or more components in a wireline network and one or more components in a wireless network. In some cases, a donor node 210 may be referred to as an anchor node, as the donor node 210 anchors the wireless network to a wireline connection. For example, each donor node 210 may include at least one wireline backhaul link 220 and one or more additional links (e.g., wireless backhaul links 225, backup wireless backhaul links 230, access links 235).

A donor node 210 may be functionally split into associated base station CU and DU entities (or "functions"), where one or more DUs associated with a donor node 210 may be partially controlled by an associated CU. CUs of donor nodes 210 may host layer 3 (L3) (e.g., RRC, service data adaption protocol (SDAP), PDCP) functionality and signaling. Further, CUs of donor nodes 210 may communicate with the core network 205 over a wireline backhaul link 220 (e.g., which may be referred to as an NG interface). DUs may host lower layer operations, such as layer 1 (L1) or layer 2 (L2) (e.g., RLC, MAC, physical layer) functionality and signaling. A DU entity of a donor node 210 may support a serving cell within the network coverage area according to connections associated with wireless backhaul links 225 and access links 235 of the IAB network. DUs of the donor nodes 210 may control both access and backhaul links within the corresponding network coverage and may provide controlling and scheduling for descendant (i.e., child, relay) IAB nodes 215 and or UEs 115. For example, a DU may support an RLC channel connection with a UE 115 (e.g., via an access link 235) or with an IAB node 215 (e.g., via a backhaul link, such as a primary wireless backhaul link 225 or a backup wireless backhaul link 230). A DU of a node 215 may be responsible for relaying (e.g., transporting, forwarding) messages from another node (e.g., to a CU and/or the core network 205) so that the other node can register with the core network 205 and establish a secure RRC connection with the CU of a donor node 210.

IAB nodes 215 may, in some examples, be functionally split into associated MT and base station DU entities, where MT functionality of the IAB nodes 215 may be controlled or scheduled by antecedent (i.e., parent) IAB nodes via wireless backhaul links. A parent node to an IAB node 215 may be another (antecedent) IAB node 215 or a donor node 210. The MT functionality may be similar to functionality performed by UEs 115 in the system. An IAB node 215 may not be directly connected to a wireline backhaul link 220. Instead, the IAB node 215 may connect to the core network 205 via other IAB nodes (e.g., any number of additional IAB nodes 215 and a donor node 210) using wireless backhaul links. The IAB node 215 may transmit upstream (e.g., towards the core network 205) in the IAB system using MT functionality. In some cases, DUs of the IAB nodes 215 may be partially controlled by signaling messages from CU entities of an associated IAB donor node 210 (e.g., transmitted via an F1-application protocol (F1-AP)). The DUs of the IAB nodes 215 may support serving cells of the network coverage area. For example, a DU of an IAB node 215 may perform the same or similar functions as a DU of an IAB donor node 210, supporting one or more access links 235 for UEs 115, one or more wireless backhaul links for downstream IAB nodes 215, or both. In some examples, an IAB node 215 is a device, such as a base station or UE (e.g., a UE 115 may be an IAB node).

In some cases, IAB network 200 may employ relay chains for communications within the IAB network architecture. For example, a UE 115 may communicate with an IAB node, and the IAB node may relay the data to a base station CU or the core network 205 either directly or via one or more IAB nodes 215. Each IAB node 215 may include a primary wireless backhaul link 225 for relaying data upstream or receiving information from a base station CU or the core network 205. In some cases, an IAB node 215 may additionally include one or more backup wireless backhaul links 230 (e.g., for redundant connectivity or improved robustness). If the primary wireless backhaul link 225 fails (e.g., due to interference, malfunction at a connected IAB node, movement of IAB nodes, maintenance at IAB nodes), an IAB node 215 may use a backup wireless backhaul link 230 for backhaul communication within the IAB network. The first (e.g., primary) wireless backhaul link 225 may be associated with a coverage area and MT functionality may be controlled or scheduled by a first parent node. The one or more secondary backhaul links (e.g., backup wireless backhaul links 230) may be associated with a non-collocated coverage area and controlled or scheduled by one or more parent nodes.

According to the techniques described herein, IAB nodes 215 may obtain information for routing communications to other IAB nodes 215, such as a routing address, as discussed for several examples illustrated in FIGS. 3 through 6

Figure 3:
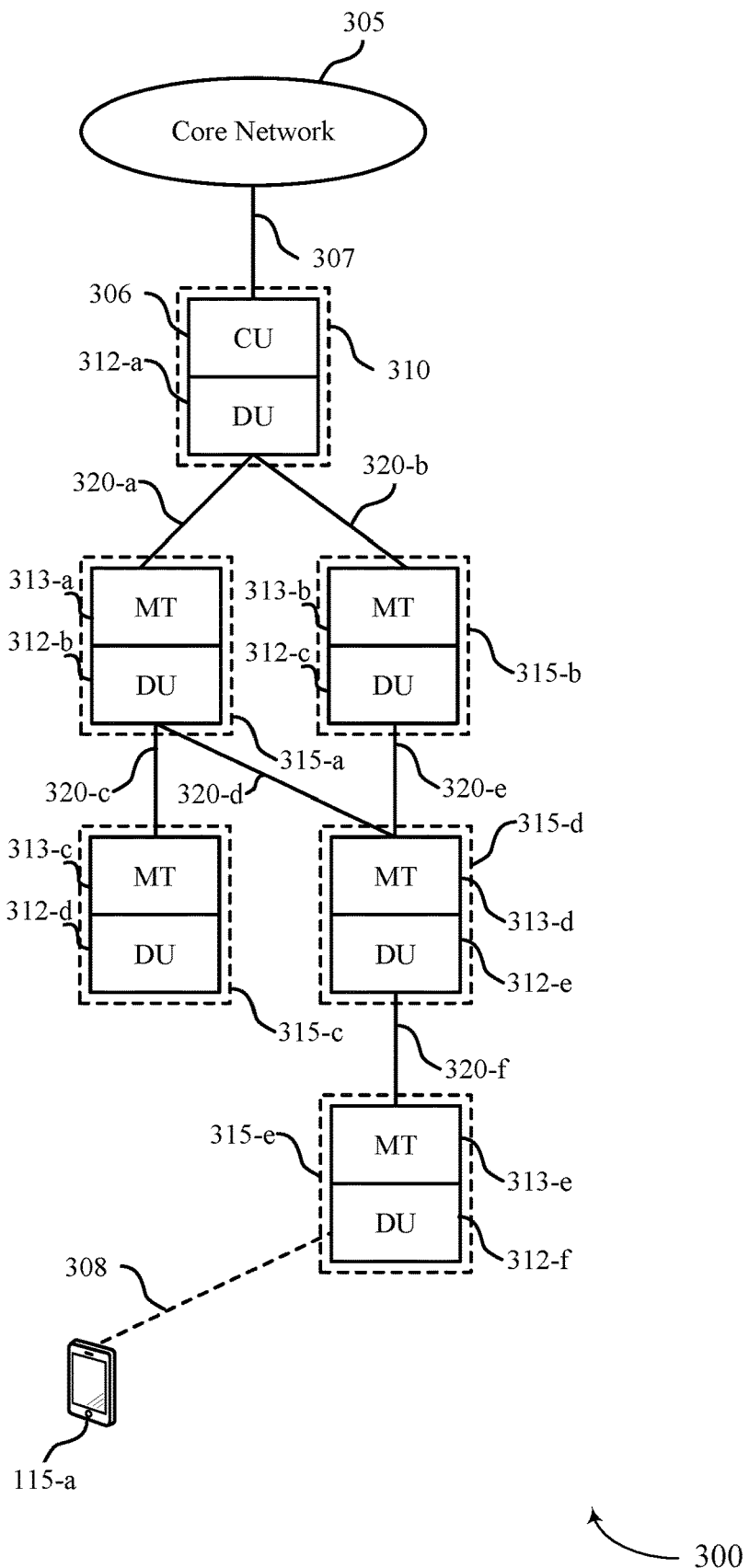
FIG. 3 illustrates an example of a node configuration scheme that supports mesh connectivity in an IAB network in accordance with aspects of the present disclosure.

FIG. 3 illustrates an example of node configuration scheme 300 that supports mesh connectivity in an integrated access and backhaul network in accordance with aspects of the present disclosure. In some examples, node configuration scheme 300 may implement one or more aspects of FIG. 1 or 2. For instance, central control node 310 may be an example of a donor node 210 as described with reference to FIG. 2 and may be an example of a base station 105 as described with reference to FIG. 1. Further, relay nodes 315 may be examples of IAB nodes 215 of FIG. 2 and may be examples of base stations 105 as described with reference to FIG. 1, and UE 115-a may be an example of a UE 115 as described with reference to FIG. 1 or 2.

In this example, core network 305 may be coupled (e.g., via a wired connection such as a fiber-optic connection) to a CU 306 of central control node 310 via communication link 307. The CU 306 may provide configuration for a number of relay nodes 315, including first relay node 315-a through fifth relay node 315-e. A DU 312-a of the central control node 310 may be coupled with a MT 313-a of first relay node 315-a via communication link 320-a (e.g., a wireless backhaul link), and coupled with an MT of second relay node 315-b via communication link 320-b. The first relay node 315-a may include a DU 312-b and relay node 315-b may include a DU 312-c. The DU 312-b of relay node 315-a may be coupled with an MT 313-c of third relay node 315-c via communication link 320-c and with MT 313-d of fourth relay node 315-d via communication link 320-d. The second relay node 315-b may include DU 312-c that may be coupled with MT 313-d of the fourth relay node 315-d via communication link 320-e. DU 312-e of the fourth relay node 315-d may be coupled with an MT 313-e of fifth relay node 315-e via communication link 320-f. The fifth relay node 315-e may include a DU 312-f that communicates with UE 115-a via communications link 308.

In some examples, central control node 310 may be a parent node of first relay node 315-a and second relay node 315-b (e.g., relay nodes 315-a and 315-b may be child nodes of central control node 310). First relay node 315-a may be a parent node of third relay node 315-c (e.g., third relay node 315-c may be a child node of first relay node 315-a) and the communication link 320-d with the fourth relay node 315-d may be a backup link such that the second relay node 315-b is a parent node of the fourth relay node 315-d. The fourth relay node 315-d may be a parent node of fifth relay node 315-e.

In some examples, the fourth relay node 315-d may detect a discovery signal of the third relay node 315-c (e.g., a broadcast signal from DU 312-d that includes a cell identification or cell global identify (CGI) of the third relay node 315-c) and initiate coordination with the third relay node 315-c. In some cases, the fourth relay node 315-d may determine the routing address of the third relay node 315-c by requesting the routing address from the central control node 310, such as illustrated for one example in FIG. 4. In other cases, the fourth relay node 315-d may establish a sidelink connection with the third relay node 315-c to obtain the routing address, such as illustrated for one example in FIG. 5. In other cases, the fourth relay node 415-d may receive a mapping between routing addresses and cell IDs that are transmitted in discovery signals of multiple different relay nodes 315, and the routing address of the third relay node 315-c may be determined based on the received mapping, such as illustrated for one example in FIG. 6. Based on the routing address of the third relay node 315-c, the fourth relay node 315-d may then transmit a communication to the third relay node 315-c via a different node such as first relay node 315-a using the routing address.

Figure 4:
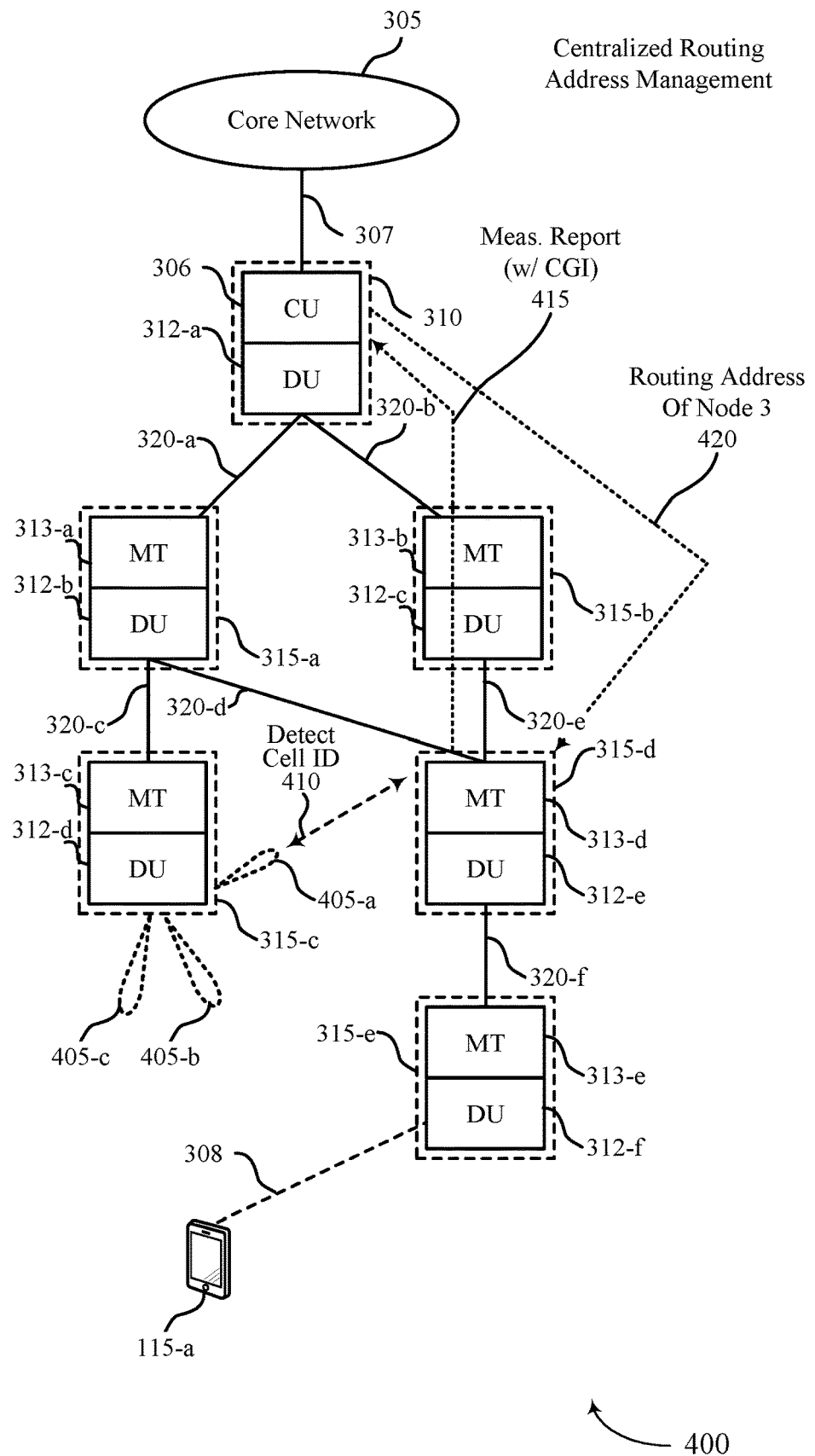
FIGS. 4 through 6 illustrate examples of routing address determination that supports mesh connectivity in IAB networks in accordance with aspects of the present disclosure.

FIG. 4 illustrates an example of a routing address determination 400 based on centralized routing address management that supports mesh connectivity in integrated access and backhaul networks in accordance with aspects of the present disclosure. In this example, the node configuration scheme 300 of FIG. 3 may be used, with the central control node 310 providing routing address information based on one or more requests or measurement reports received from one or more relay nodes 315.

In this example, the fourth relay node 315-d may detect a discovery signal 405 of the third relay node 315-c (e.g., MT 313-d may monitor for discovery signals of neighboring nodes, or UEs 115). In this example, the discovery signal 405 may be a broadcast signal transmitted by DU 312-d on multiple beams (e.g., different SSBs transmitted on different beams) to provide beamformed discovery signals 405-a, 405-b, and 405-c. The MT 313-d of the fourth relay node 315-d may detect a cell ID 410 (e.g., CGI) of the DU 312-d of third relay node 315-c.

In this example, the fourth relay node 315-d may transmit a measurement report 415 with the detected cell ID (and one or more other detected cell IDs of one or more other detected discovery signals of other relay nodes) to the central control node 310. The central control node 310 (e.g., CU 306) may then transmit a routing address 420 of the third relay node 315-c. The fourth relay node 315-d may then transmit a message to the third relay node 315-c using the routing address (e.g., via the third relay node 315-c, central control node 310, and first relay node 315-a; or via the first relay node 315-a directly on the communication link 320-d). The third relay node 315-c may send a responsive communication back to the fourth relay node 315-d using a routing address of the fourth relay node 315-d (e.g., that is provided in the message from the fourth relay node 315-d or determined based on techniques as discussed herein). In some cases, communications between relay nodes 315 may allow for support of distributed algorithms for topology discovery, routing, load-balancing, resource coordination, interference management, or any combinations thereof, without involvement of CU 306. In some cases, messages between relay nodes 315, the measurement report 415, and the message providing the routing address 420 may be defined messages in a BAP, having information fields and payload fields that are used to convey information or requests. Additionally or alternatively, messages between relay nodes 315 may be transmitted as PHY layer or MAC layer (e.g., a MAC control element) messages. In some cases, the central control node 310 (e.g., CU 306) may configure or enable the relay nodes 315 to provide for such communications.

Figure 5:
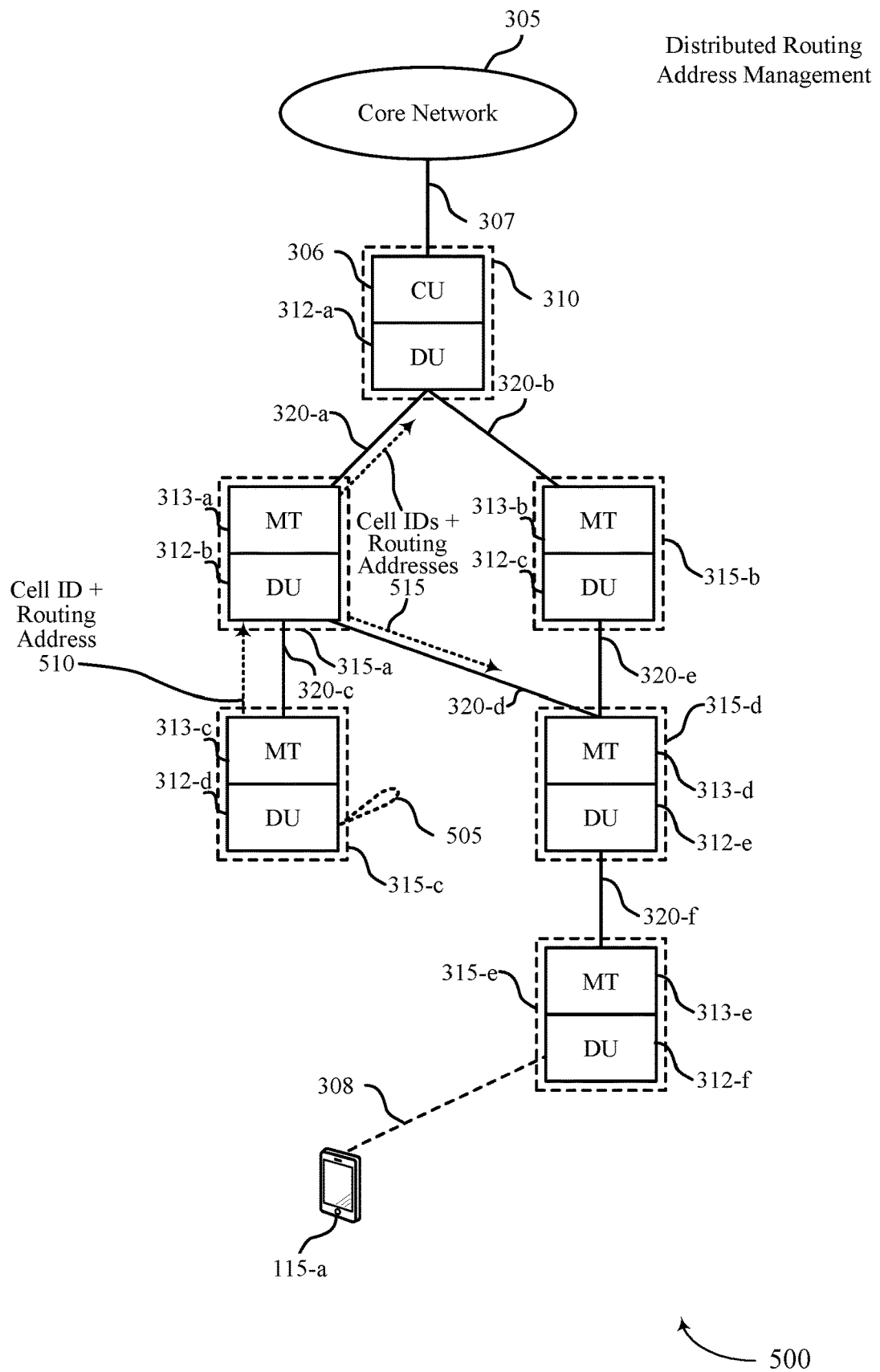

FIG. 5 illustrates an example of a routing address determination 500 based on distributed routing address management that supports mesh connectivity in integrated access and backhaul networks in accordance with aspects of the present disclosure. In this example, the node configuration scheme 300 of FIG. 3 may be used, with one or multiple relay nodes 315 (and optionally the central control node 310) providing routing address information for itself and any child nodes.

In this example, the fourth relay node 315-d may again detect a discovery signal 505 of the third relay node 315-c (e.g., MT 313-d may monitor for discovery signals of neighboring nodes, or UEs 115). In this example, the discovery signal 505, similarly as discussed with reference to FIG. 4, may be a broadcast signal transmitted by DU 312-d on multiple beams (e.g., different SSBs transmitted on different beams), and the MT 313-d of the fourth relay node 315-d may detect a cell ID of the DU 312-d of third relay node 315-c. In this example, each relay node 315 may transmit an indication of a cell ID and routing address 510 of itself and any child nodes to its parent node, and the parent node may forward cell IDs and routing addresses 515 to other nodes to which it is connected. In such a manner, cell IDs and corresponding routing addresses may be communicated to multiple nodes of the IAB network, and a relay node 315 may use this information to format and transmit a message to a particular other relay node 315 for communications coordination. Continuing with the example of FIG. 5, the third relay node 315-*c* may transmit an indication of its cell ID and routing address to the first relay node 315-*a*, which may in turn transmit information with cell IDs and routing addresses 515 to the fourth relay node 315-*d* and central control node 310. In such cases, the fourth relay node 315-*d* may detect discovery signal 505 of the third relay node 315-*c*, and may determine the routing address of the third relay node 315-*c* based on a mapping between the detected cell ID and the cell IDs and routing addresses 515 that are received from the first relay node 315-*a*. The fourth relay node 315-*d* may then transmit a message to the third relay node 315-*c* using the routing address (e.g., via the first relay node 315-*a* on the communication link 320-*d*, where the first relay node 315-*a* acts as a first-hop router between the third relay node 315-*c* and fourth relay node 315-*d*). The third relay node 315-*c* may send a responsive communication back to the fourth relay node 315-*d* using a routing address of the fourth relay node 315-*d* (e.g., that is provided in the message from the fourth relay node 315-*d* or determined based on the mapping provided by the first relay node 315-*a*). In some cases, communications between relay nodes 315 may allow for support of distributed algorithms for topology discovery, routing, load-balancing, resource coordination, interference management, or any combinations thereof, without involvement of CU 306. In some cases, the central control node 310 (e.g., CU 306) may configure or enable the relay nodes 315 to provide for such communications.

Figure 6:
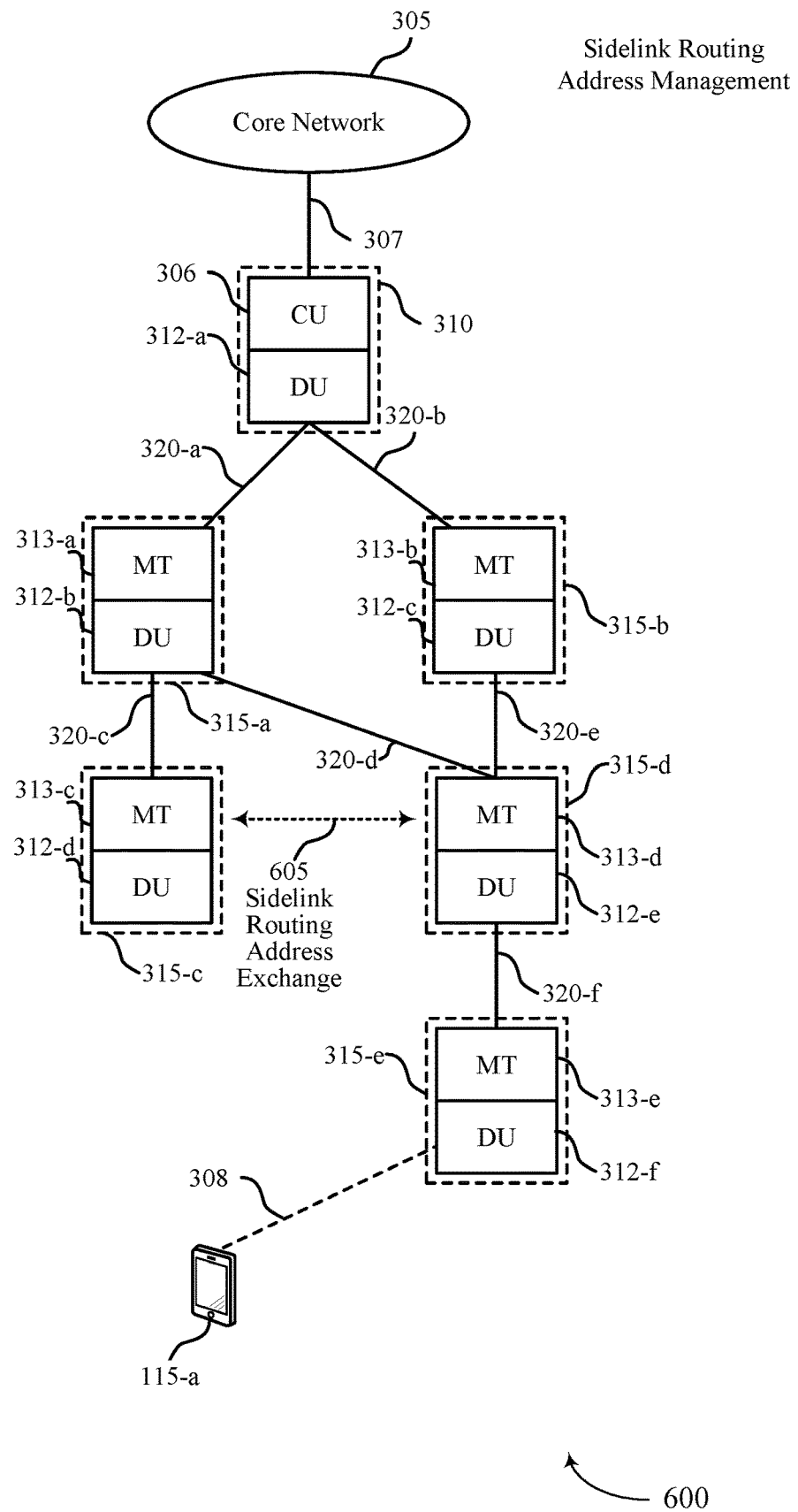

FIG. 6 illustrates an example of a routing address determination 600 based on sidelink routing address management that supports mesh connectivity in integrated access and backhaul networks in accordance with aspects of the present disclosure. In this example, the node configuration scheme 300 of FIG. 3 may be used, with relay nodes 315 exchanging routing address information directly using sidelink communications.

In this example, the fourth relay node 315-*d* may again detect a discovery signal of the third relay node 315-*c* (e.g., MT 313-*d* may monitor for discovery signals of neighboring nodes, or UEs 115). In this example, the discovery signal, similarly as discussed with reference to FIG. 4, may be a broadcast signal transmitted by DU 312-*d* on multiple beams (e.g., different SSBs transmitted on different beams), and the MT 313-*d* of the fourth relay node 315-*d* may detect a cell ID of the DU 312-*d* of third relay node 315-*c*. In this example, one or more relay nodes 315 may be configured for sidelink communications, in which relay nodes may communicate directly over a sidelink (e.g., a PC5 link). In this example, based on detection of the discovery signal of the third relay node 315-*c*, the fourth relay node 315-*d* may establish a sidelink connection 605 with the third relay node 315-*c*, and obtain the routing address directly from the third relay node 315-*c*. In some cases, the fourth relay node 315-*d* and the third relay node 315-*c* may coordinate communication for (e.g., for interference management) via the sidelink connection 605, via BAP messages using the determined routing addresses, or any combinations thereof. In some cases, communications between relay nodes 315 may allow for support of distributed algorithms for topology discovery, routing, load-balancing, resource coordination, interference management, or any combinations thereof, without involvement of CU 306. In some cases, the central control node 310 (e.g., CU 306) may configure or enable the relay nodes 315 to provide for such communications.

In the example of FIG. 6, as well as in the examples of FIGS. 3 through 5, the discovery signal may also be the sidelink discovery signal broadcasted by IAB MT 313-*c* (or other IAB node). In one example, one discovery signal may be enhanced with information of other discovery signal, such as a sidelink discovery signal sent by IAB MT that is enhanced with cell-ID of a discovery signal sent by IAB DU of same IAB node. In some cases, information (e.g., quasi co-location (QCL) information for identifying a beam) that facilitates detection of a second discovery signal is provided (e.g., broadcasted) upon detection of first discovery signal, and upon detection of second discovery signal information such as cell ID may be acquired.

It is to be understood that the examples of FIGS. 3 through 6 are provided for purposes of illustration and discussion, and that numerous other examples for routing address determination for use in mesh connectivity in a network may be implemented in accordance with techniques as described herein. For example, a first IAB node (e.g., that may correspond to fourth relay node 315-*d* in FIGS. 3 through 6) may receive an indication of an association between a discovery signal transmitted by a second IAB node (e.g., that may correspond to the third relay node 315-*c*) and a routing address of the second IAB node, and the first IAB mode may communicate with the second IAB node via an intermediate node (e.g., first relay node 315-*a* and/or other relay nodes 315 of FIGS. 3 through 6) using the routing address of the second IAB node based on detecting a transmission of the discovery signal by the second IAB node. The first IAB node may receive the indication of the routing address from a neighboring IAB node, from an IAB donor CU, or from the second IAB-node (e.g., via sidelink). In some cases, the first IAB node may indicate detection of the discovery signal or report a measurement of the discovery signal, where the routing address associated with the discovery signal is received based on the transmitted indication or report. In other cases, the first IAB node may detect the discovery signal of the second IAB node and request a routing address associated with the detected discovery signal, and the indication by the first IAB node above may be based on the request. In some cases, the discovery signal may provide a system information block (SIB) message of the second IAB node.

In another example, a second IAB node may provide a third IAB node with an indication of an association between a discovery signal transmitted by the second IAB node and a routing address of the second IAB node, and the second IAB node may communicate with a first IAB node via a fourth IAB node using the routing address of the second IAB node based on detection of the discovery signal of the second IAB node by the first IAB node. In some cases, the third IAB node and the fourth IAB node may be the same (e.g., corresponding to first relay node 315-*a*). In some cases, the first IAB node and the third IAB node may be the same (e.g., the first IAB node may detect a discovery signal transmitted by the second IAB node. The first IAB node may establishes a sidelink connection with the second IAB node, and the routing address of the second IAB node is provided on the sidelink connection). In some cases, the second IAB node may receive a request for a routing address of the second IAB node associated with the transmission of a discovery signal by the second IAB node, and providing the indication by the second IAB node may include providing a routing address of the second IAB node based on the request.

In another example, a local or central node (e.g., a relay node 315 or central control none 310) may communicate an indication of a discovery signal transmitted by a second IAB node with the second IAB node or a fifth node, and communicate a routing address of the second IAB node with the second IAB node or fifth node. The local or central node may provide an indication of an association between the discovery signal transmitted by the second IAB node and the routing address of the second IAB node to the first IAB-node. In some cases, the fifth node may be a second IAB donor CU that has a connection to the second IAB node. In other cases, the fifth node may be a UE or an IAB node that detects or reports a measurement of a discovery signal transmitted by the second IAB node. In some cases, the communicating an indication of a discovery signal may include receiving a report of a measurement of the discovery signal, receiving an indication that the discovery signal is associated with a cell broadcast and the cell is served by the second IAB node. In some cases, the local or central node may configure the transmission of the discovery signal by the second IAB node, and the communicating the routing address may include allocating the routing address to the second IAB-node. In some cases, the communicating the routing address may include receiving the routing address of the second IAB node. In some cases, the communicating the indication of the discovery signal and the communicating the routing address may refer to a single communication of the local or central node, which may include receiving an indication of an association between a discovery signal transmitted by a second IAB node and a routing address of the second IAB node. In some cases, the providing the indication of an association between the discovery signal transmitted by the second IAB node and the routing address of the second IAB node may be based on a configuration from the IAB donor CU, and the configuration may include whether to provide/forward the indication, to what node, on what route/RLC channel, on what schedule, based on what trigger (e.g., change of routing address), and the like.

In various of the examples provided herein, the discovery signal may correspond to a signal transmitted by second node IAB MT (e.g., a sidelink or primary/secondary synchronization signal, or sidelink broadcast channel), may correspond to a signal transmitted by the second node IAB DU (e.g., a SSB, SIB, etc.), or a cell identifier associated with a transmission of the second node (e.g., physical cell ID (PCI), NR cell ID (NCI), NR cell global ID (NCGI), etc.). In some examples, the routing address may correspond to an IP address of the second IAB node, or a BAP address of the second IAB node. In various examples, local communications between IAB nodes may use IP, BAP, MAC-CE or downlink control information (DCI). In some cases, communication with an IAB donor CU may use a defined interface (e.g., an F1 interface) or RRC communications. In some cases, multiple discovery signals (e.g., multiple cell IDs) may be associated with one routing address or one discovery signal may be associated with multiple routing addresses, and indications of the associations may include multiple discovery signals or routing addresses, or combinations thereof (e.g., even though one discovery signal may be detected).

Figure 7:
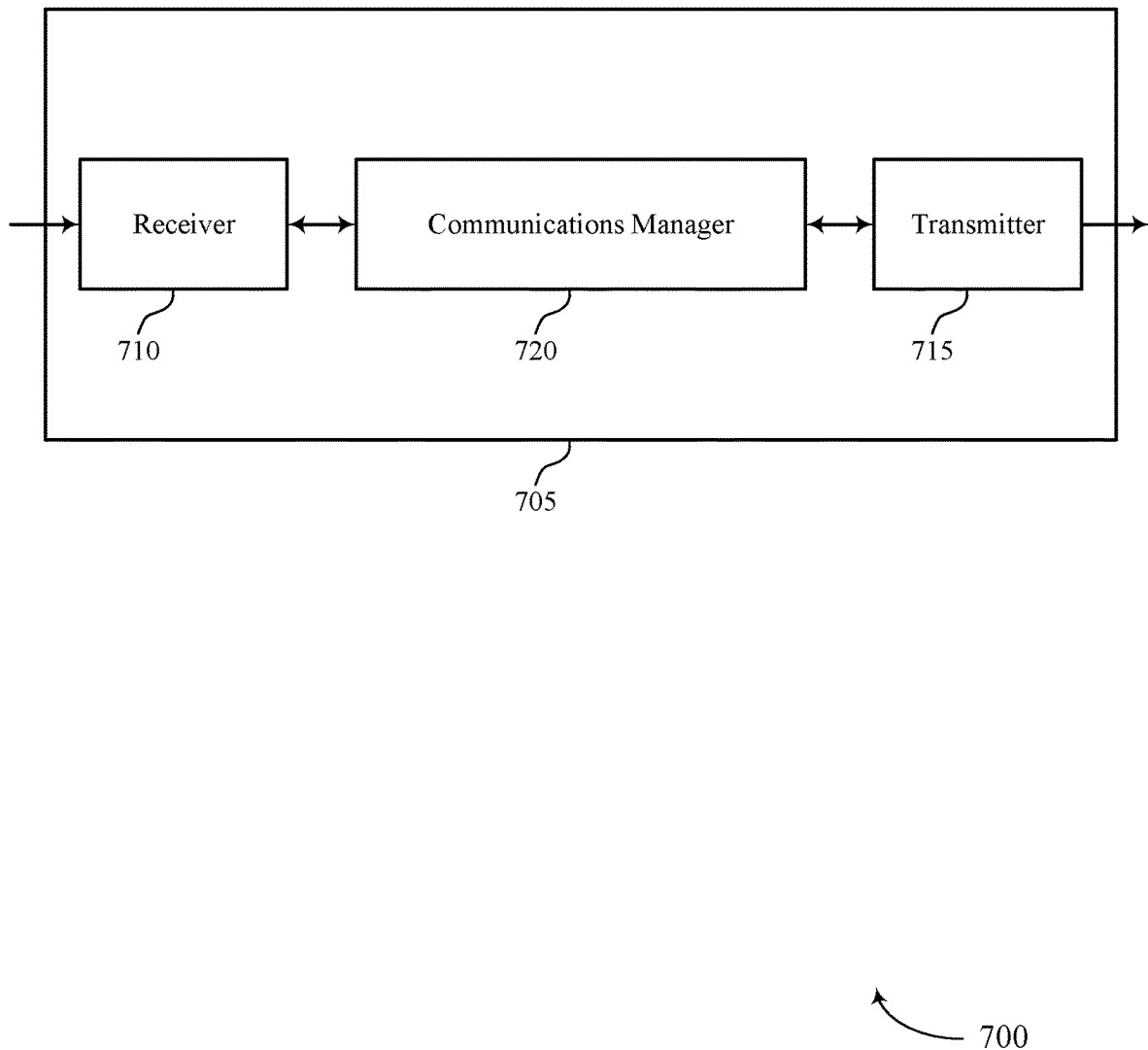
FIGS. 7 and 8 show block diagrams of devices that support mesh connectivity in integrated access and backhaul networks in accordance with aspects of the present disclosure.

FIG. 7 shows a block diagram 700 of a device 705 that supports mesh connectivity in integrated access and backhaul networks in accordance with aspects of the present disclosure. The device 705 may be an example of aspects of a UE 115 or a base station 105 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to mesh connectivity in integrated access and backhaul networks). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to mesh connectivity in integrated access and backhaul networks). In some examples, the transmitter 715 may be co-located with a receiver 710 in a transceiver module. The transmitter 715 may utilize a single antenna or a set of multiple antennas.

The communications manager 720, the receiver 710, the transmitter 715, or various combinations thereof or various components thereof may be examples of means for performing various aspects of mesh connectivity in integrated access and backhaul networks as described herein. For example, the communications manager 720, the receiver 710, the transmitter 715, or various combinations or components thereof may support a method for performing one or more of the functions described herein.

In some examples, the communications manager 720, the receiver 710, the transmitter 715, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 720, the receiver 710, the transmitter 715, or various combinations or components thereof may be implemented in code (e.g., as communications management software or firmware) executed by a processor. If implemented in code executed by a processor, the functions of the communications manager 720, the receiver 710, the transmitter 715, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 720 may be configured to perform various operations (e.g., receiving, monitoring, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to receive information, transmit information, or perform various other operations as described herein.

The communications manager 720 may support wireless communications in accordance with examples as disclosed herein. For example, the communications manager 720 may be configured as or otherwise support a means for receiving, at a first wireless node of an integrated access and backhaul network, an indication of a routing address of a second wireless node of the integrated access and backhaul network that is associated with a discovery signal transmitted by the second wireless node. The communications manager 720 may be configured as or otherwise support a means for transmitting a first message to the second wireless node using the routing address of the second wireless node, where the first message is transmitted via at least a third wireless node of the integrated access and backhaul network and provides information related to coordination of wireless communications of the first wireless node and the second wireless node.

Additionally or alternatively, the communications manager 720 may support wireless communications in accordance with examples as disclosed herein. For example, the communications manager 720 may be configured as or otherwise support a means for transmitting, from a second wireless node of an integrated access and backhaul network to one or more other wireless nodes of the integrated access and backhaul network, an indication of an association between a routing address of the second wireless node and a discovery signal transmitted by the second wireless node. The communications manager 720 may be configured as or otherwise support a means for receiving, from a first wireless node of the integrated access and backhaul network, a first message using the routing address of the second wireless node, where the first message is transmitted via at least a third wireless node of the integrated access and backhaul network and includes information related to coordination of wireless communications of the first wireless node and the second wireless node.

By including or configuring the communications manager 720 in accordance with examples as described herein, the device 705 (e.g., a processor controlling or otherwise coupled to the receiver 710, the transmitter 715, the communications manager 720, or a combination thereof) may support techniques for determination of routing addresses for mesh connectivity between network nodes, which may allow for support of distributed algorithms for topology discovery, routing, load-balancing, resource coordination, or any combinations thereof, without involvement of a central or control node of the network, thereby enhancing communications efficiency and reliability.

Figure 8:
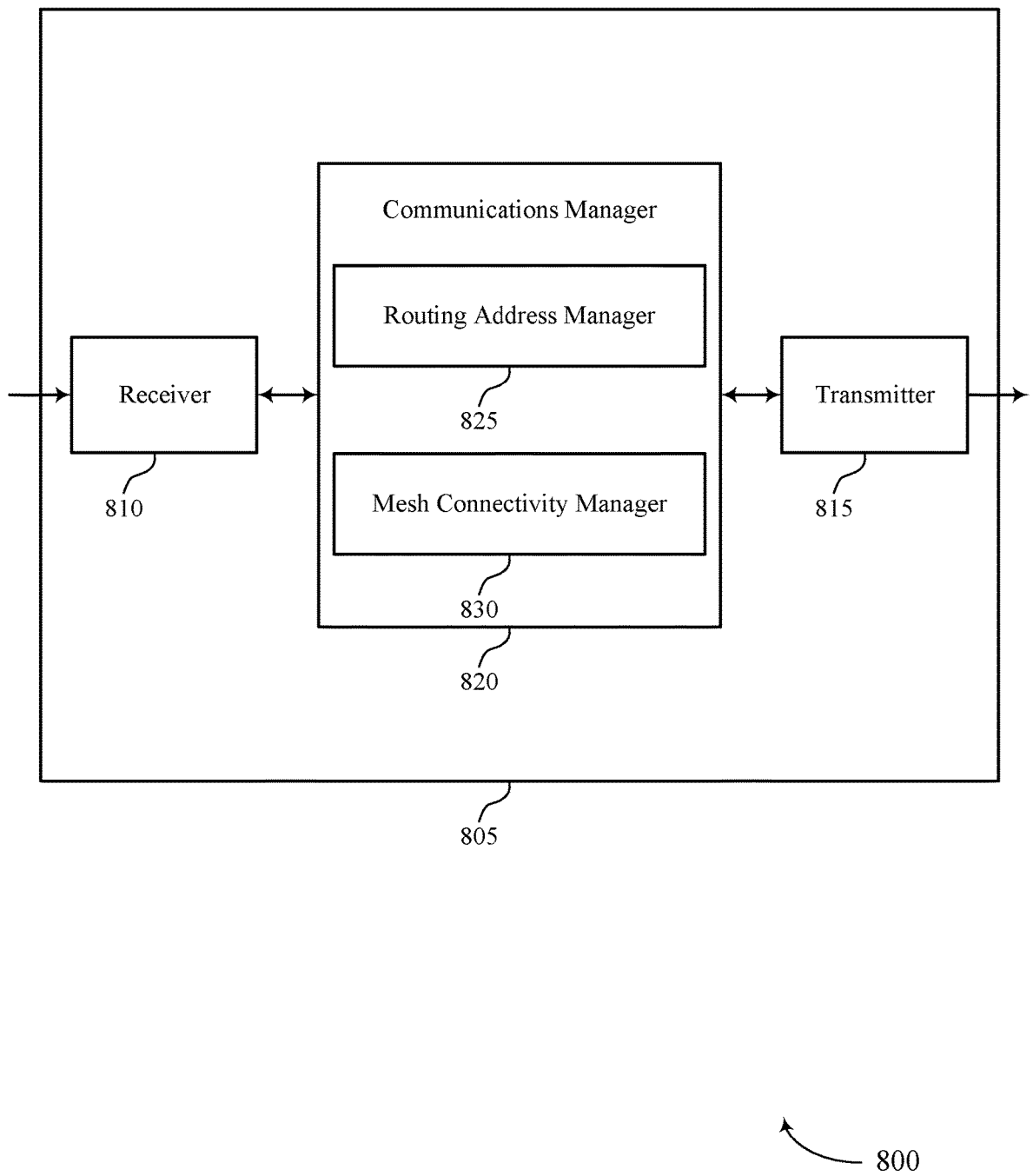

FIG. 8 shows a block diagram 800 of a device 805 that supports mesh connectivity in integrated access and backhaul networks in accordance with aspects of the present disclosure. The device 805 may be an example of aspects of a device 705, a UE 115, or a base station 105 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to mesh connectivity in integrated access and backhaul networks). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to mesh connectivity in integrated access and backhaul networks). In some examples, the transmitter 815 may be co-located with a receiver 810 in a transceiver module. The transmitter 815 may utilize a single antenna or a set of multiple antennas.

The device 805, or various components thereof, may be an example of means for performing various aspects of mesh connectivity in integrated access and backhaul networks as described herein. For example, the communications manager 820 may include a routing address manager 825 a mesh connectivity manager 830, or any combination thereof. The communications manager 820 may be an example of aspects of a communications manager 720 as described herein. In some examples, the communications manager 820, or various components thereof, may be configured to perform various operations (e.g., receiving, monitoring, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to receive information, transmit information, or perform various other operations as described herein.

The communications manager 820 may support wireless communications in accordance with examples as disclosed herein. The routing address manager 825 may be configured as or otherwise support a means for receiving, at a first wireless node of an integrated access and backhaul network, an indication of a routing address of a second wireless node of the integrated access and backhaul network that is associated with a discovery signal transmitted by the second wireless node. The mesh connectivity manager 830 may be configured as or otherwise support a means for transmitting a first message to the second wireless node using the routing address of the second wireless node, where the first message is transmitted via at least a third wireless node of the integrated access and backhaul network and provides information related to coordination of wireless communications of the first wireless node and the second wireless node.

Additionally or alternatively, the communications manager 820 may support wireless communications in accordance with examples as disclosed herein. The routing address manager 825 may be configured as or otherwise support a means for transmitting, from a second wireless node of an integrated access and backhaul network to one or more other wireless nodes of the integrated access and backhaul network, an indication of an association between a routing address of the second wireless node and a discovery signal transmitted by the second wireless node. The mesh connectivity manager 830 may be configured as or otherwise support a means for receiving, from a first wireless node of the integrated access and backhaul network, a first message using the routing address of the second wireless node, where the first message is transmitted via at least a third wireless node of the integrated access and backhaul network and includes information related to coordination of wireless communications of the first wireless node and the second wireless node.

Figure 9:
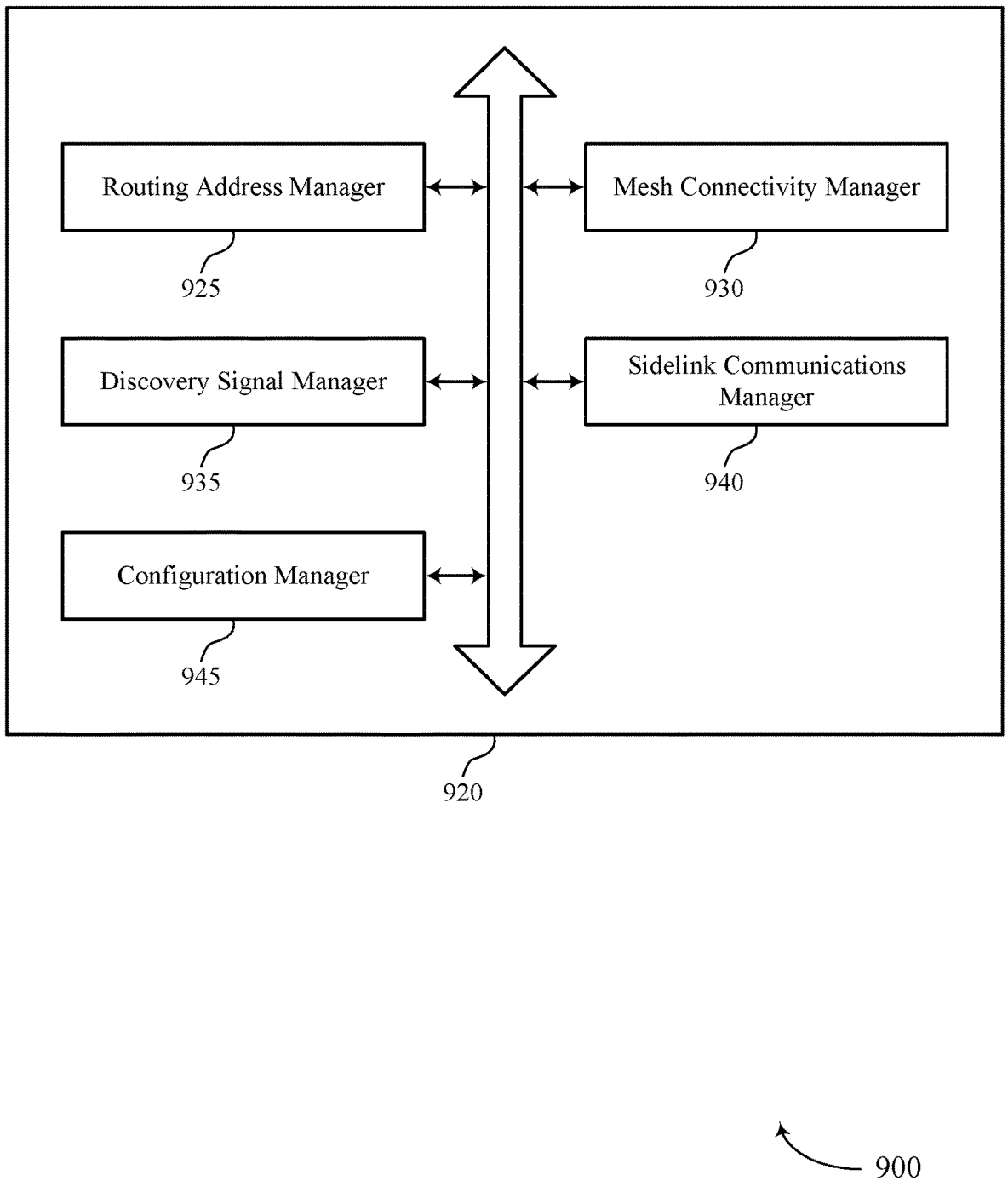
FIG. 9 shows a block diagram of a communications manager that supports mesh connectivity in integrated access and backhaul networks in accordance with aspects of the present disclosure.

FIG. 9 shows a block diagram 900 of a communications manager 920 that supports mesh connectivity in integrated access and backhaul networks in accordance with aspects of the present disclosure. The communications manager 920 may be an example of aspects of a communications manager 720, a communications manager 820, or both, as described herein. The communications manager 920, or various components thereof, may be an example of means for performing various aspects of mesh connectivity in integrated access and backhaul networks as described herein. For example, the communications manager 920 may include a routing address manager 925, a mesh connectivity manager 930, a discovery signal manager 935, a sidelink communications manager 940, a configuration manager 945, or any combination thereof. Each of these components may communicate, directly or indirectly, with one another (e.g., via one or more buses).

The communications manager 920 may support wireless communications in accordance with examples as disclosed herein. The routing address manager 925 may be configured as or otherwise support a means for receiving, at a first wireless node of an integrated access and backhaul network, an indication of a routing address of a second wireless node of the integrated access and backhaul network that is associated with a discovery signal transmitted by the second wireless node. The mesh connectivity manager 930 may be configured as or otherwise support a means for transmitting a first message to the second wireless node using the routing address of the second wireless node, where the first message is transmitted via at least a third wireless node of the integrated access and backhaul network and provides information related to coordination of wireless communications of the first wireless node and the second wireless node.

In some examples, to support receiving, the routing address manager 925 may be configured as or otherwise support a means for receiving the indication of the routing address of the second wireless node from a neighboring wireless node of the integrated access and backhaul network, a donor central unit node of the integrated access and backhaul network, or any combinations thereof.

In some examples, the discovery signal manager 935 may be configured as or otherwise support a means for receiving the discovery signal from the second wireless node. In some examples, the mesh connectivity manager 930 may be configured as or otherwise support a means for transmitting a request for the routing address of the second wireless node responsive to the receiving the discovery signal, where the request is transmitted to the second wireless node, a neighboring wireless node of the integrated access and backhaul network, or a donor central unit node of the integrated access and backhaul network. In some examples, the indication of the routing address of the second wireless node is received via a sidelink communications connection between the first wireless node and the second wireless node.

In some examples, the discovery signal manager 935 may be configured as or otherwise support a means for transmitting a report to the third wireless node or a different wireless node of the integrated access and backhaul network, where the report indicates detection of the discovery signal transmitted by the second wireless node, and where the indication of the routing address is received responsive to transmitting the report. In some examples, the discovery signal transmitted by the second wireless node includes a system information block of the second wireless node.

In some examples, the routing address manager 925 may be configured as or otherwise support a means for transmitting an indication of the routing address of the second wireless node to one or more other wireless nodes of the integrated access and backhaul network. In some examples, the transmitting the indication of the routing address is performed based on a configuration received from a central unit node of the integrated access and backhaul network. In some examples, the discovery signal is one or more of a synchronization signal, broadcast channel, a SSB, an SIB, or any combinations thereof, transmitted by the second wireless node. In some examples, the discovery signal includes a cell identifier, and where the routing address of the second wireless node is associated with the cell identifier of the discovery signal. In some examples, the routing address of the second wireless node is an IP address or a BAP address.

In some examples, the first message is transmitted to the second wireless node using one or more of IP communications, BAP communications, a MAC control element of a wireless communications protocol, a DCI transmission of the wireless communications protocol, or any combinations thereof. In some examples, the discovery signal includes a cell identifier, and where a set of multiple cell identifiers are associated with the routing address of the second wireless node.

Additionally or alternatively, the communications manager 920 may support wireless communications in accordance with examples as disclosed herein. In some examples, the routing address manager 925 may be configured as or otherwise support a means for transmitting, from a second wireless node of an integrated access and backhaul network to one or more other wireless nodes of the integrated access and backhaul network, an indication of an association between a routing address of the second wireless node and a discovery signal transmitted by the second wireless node. In some examples, the mesh connectivity manager 930 may be configured as or otherwise support a means for receiving, from a first wireless node of the integrated access and backhaul network, a first message using the routing address of the second wireless node, where the first message is transmitted via at least a third wireless node of the integrated access and backhaul network and includes information related to coordination of wireless communications of the first wireless node and the second wireless node.

In some examples, the transmitting is performed based on a configuration received from a central unit node of the integrated access and backhaul network. In some examples, the indication of the association between the routing address and the discovery signal is transmitted by the second wireless node to the third wireless node or a different wireless node of the integrated access and backhaul network for providing the first wireless node with the routing address that is associated with the discovery signal.

In some examples, the routing address manager 925 may be configured as or otherwise support a means for receiving, from the first wireless node or from another node of the integrated access and backhaul network, a request for the routing address of the second wireless node, and where the indication of the association between the routing address of the second wireless node and the discovery signal is transmitted based on the request. In some examples, the indication of the routing address of the second wireless node is transmitted via a sidelink communications connection between the first wireless node and the second wireless node.

In some examples, the discovery signal is one or more of a synchronization signal, broadcast channel, a synchronization signal block (SSB), an SIB, or any combinations thereof, transmitted by the second wireless node. In some examples, the discovery signal includes a cell identifier, and where the routing address of the second wireless node is associated with the cell identifier of the discovery signal.

In some examples, the routing address of the second wireless node is an IP address or a BAP address. In some examples, the first message is transmitted to the second wireless node using one or more of IP communications, BAP communications, a MAC control element of a wireless communications protocol, a DCI transmission of the wireless communications protocol, or any combinations thereof. In some examples, the discovery signal includes a cell identifier, and where a set of multiple cell identifiers are associated with the routing address of the second wireless node.

Figure 10:
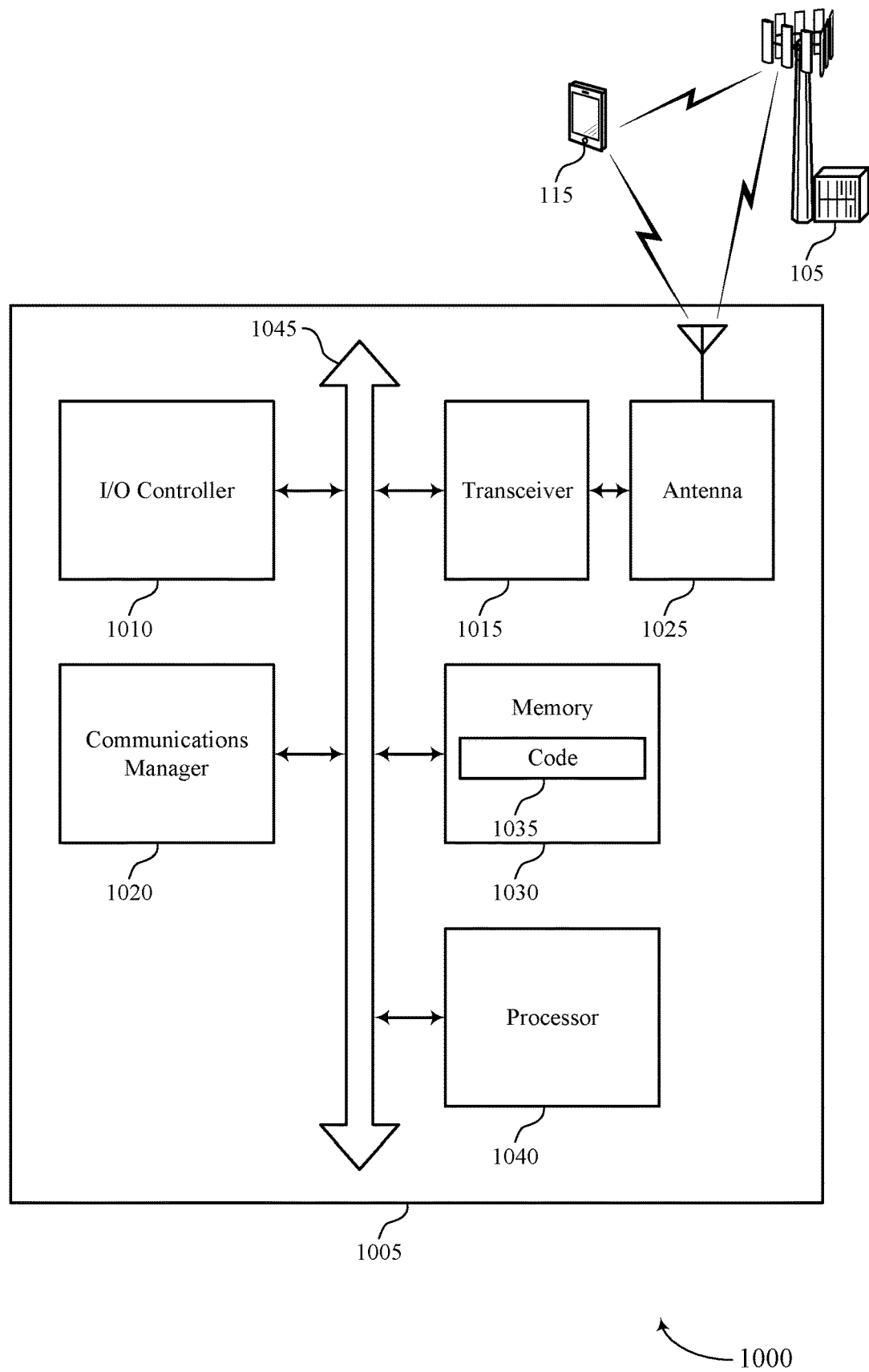
FIG. 10 shows a diagram of a system including a UE that supports mesh connectivity in integrated access and backhaul networks in accordance with aspects of the present disclosure.

FIG. 10 shows a diagram of a system 1000 including a device 1005 that supports mesh connectivity in integrated access and backhaul networks in accordance with aspects of the present disclosure. The device 1005 may be an example of or include the components of a device 705, a device 805, or a UE 115 as described herein. The device 1005 may communicate wirelessly with one or more base stations 105, UEs 115, or any combination thereof. The device 1005 may include components for bi-directional voice and data communications including components for transmitting and receiving communications, such as a communications manager 1020, an input/output (I/O) controller 1010, a transceiver 1015, an antenna 1025, a memory 1030, code 1035, and a processor 1040. These components may be in electronic communication or otherwise coupled (e.g., operatively, communicatively, functionally, electronically, electrically) via one or more buses (e.g., a bus 1045).

The I/O controller 1010 may manage input and output signals for the device 1005. The I/O controller 1010 may also manage peripherals not integrated into the device 1005. In some cases, the I/O controller 1010 may represent a physical connection or port to an external peripheral. In some cases, the I/O controller 1010 may utilize an operating system such as iOS®, ANDROID®, MS-DOS®, MS-WINDOWS®, OS/2®, UNIX®, LINUX®, or another known operating system. Additionally or alternatively, the I/O controller 1010 may represent or interact with a modem, a keyboard, a mouse, a touchscreen, or a similar device. In some cases, the I/O controller 1010 may be implemented as part of a processor, such as the processor 1040. In some cases, a user may interact with the device 1005 via the I/O controller 1010 or via hardware components controlled by the I/O controller 1010.

In some cases, the device 1005 may include a single antenna 1025. However, in some other cases, the device 1005 may have more than one antenna 1025, which may be capable of concurrently transmitting or receiving multiple wireless transmissions. The transceiver 1015 may communicate bi-directionally, via the one or more antennas 1025, wired, or wireless links as described herein. For example, the transceiver 1015 may represent a wireless transceiver and may communicate bi-directionally with another wireless transceiver. The transceiver 1015 may also include a modem to modulate the packets, to provide the modulated packets to one or more antennas 1025 for transmission, and to demodulate packets received from the one or more antennas 1025. The transceiver 1015, or the transceiver 1015 and one or more antennas 1025, may be an example of a transmitter 715, a transmitter 815, a receiver 710, a receiver 810, or any combination thereof or component thereof, as described herein.

The memory 1030 may include random access memory (RAM) and read-only memory (ROM). The memory 1030 may store computer-readable, computer-executable code 1035 including instructions that, when executed by the processor 1040, cause the device 1005 to perform various functions described herein. The code 1035 may be stored in a non-transitory computer-readable medium such as system memory or another type of memory. In some cases, the code 1035 may not be directly executable by the processor 1040 but may cause a computer (e.g., when compiled and executed) to perform functions described herein. In some cases, the memory 1030 may contain, among other things, a basic I/O system (BIOS) which may control basic hardware or software operation such as the interaction with peripheral components or devices.

The processor 1040 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In some other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting mesh connectivity in integrated access and backhaul networks). For example, the device 1005 or a component of the device 1005 may include a processor 1040 and memory 1030 coupled to the processor 1040, the processor 1040 and memory 1030 configured to perform various functions described herein.

The communications manager 1020 may support wireless communications in accordance with examples as disclosed herein. For example, the communications manager 1020 may be configured as or otherwise support a means for receiving, at a first wireless node of an integrated access and backhaul network, an indication of a routing address of a second wireless node of the integrated access and backhaul network that is associated with a discovery signal transmitted by the second wireless node. The communications manager 1020 may be configured as or otherwise support a means for transmitting a first message to the second wireless node using the routing address of the second wireless node, where the first message is transmitted via at least a third wireless node of the integrated access and backhaul network and provides information related to coordination of wireless communications of the first wireless node and the second wireless node.

Additionally or alternatively, the communications manager 1020 may support wireless communications in accordance with examples as disclosed herein. For example, the communications manager 1020 may be configured as or otherwise support a means for transmitting, from a second wireless node of an integrated access and backhaul network to one or more other wireless nodes of the integrated access and backhaul network, an indication of an association between a routing address of the second wireless node and a discovery signal transmitted by the second wireless node. The communications manager 1020 may be configured as or otherwise support a means for receiving, from a first wireless node of the integrated access and backhaul network, a first message using the routing address of the second wireless node, where the first message is transmitted via at least a third wireless node of the integrated access and backhaul network and includes information related to coordination of wireless communications of the first wireless node and the second wireless node.

By including or configuring the communications manager 1020 in accordance with examples as described herein, the device 1005 may support techniques for determination of routing addresses for mesh connectivity between network nodes, which may allow for support of distributed algorithms for topology discovery, routing, load-balancing, resource coordination, or any combinations thereof, without involvement of a central or control node of the network, thereby enhancing communications efficiency, reliability, and user experience.

In some examples, the communications manager 1020 may be configured to perform various operations (e.g., receiving, monitoring, transmitting) using or otherwise in cooperation with the transceiver 1015, the one or more antennas 1025, or any combination thereof. Although the communications manager 1020 is illustrated as a separate component, in some examples, one or more functions described with reference to the communications manager 1020 may be supported by or performed by the processor 1040, the memory 1030, the code 1035, or any combination thereof. For example, the code 1035 may include instructions executable by the processor 1040 to cause the device 1005 to perform various aspects of mesh connectivity in integrated access and backhaul networks as described herein, or the processor 1040 and the memory 1030 may be otherwise configured to perform or support such operations.

Figure 11:
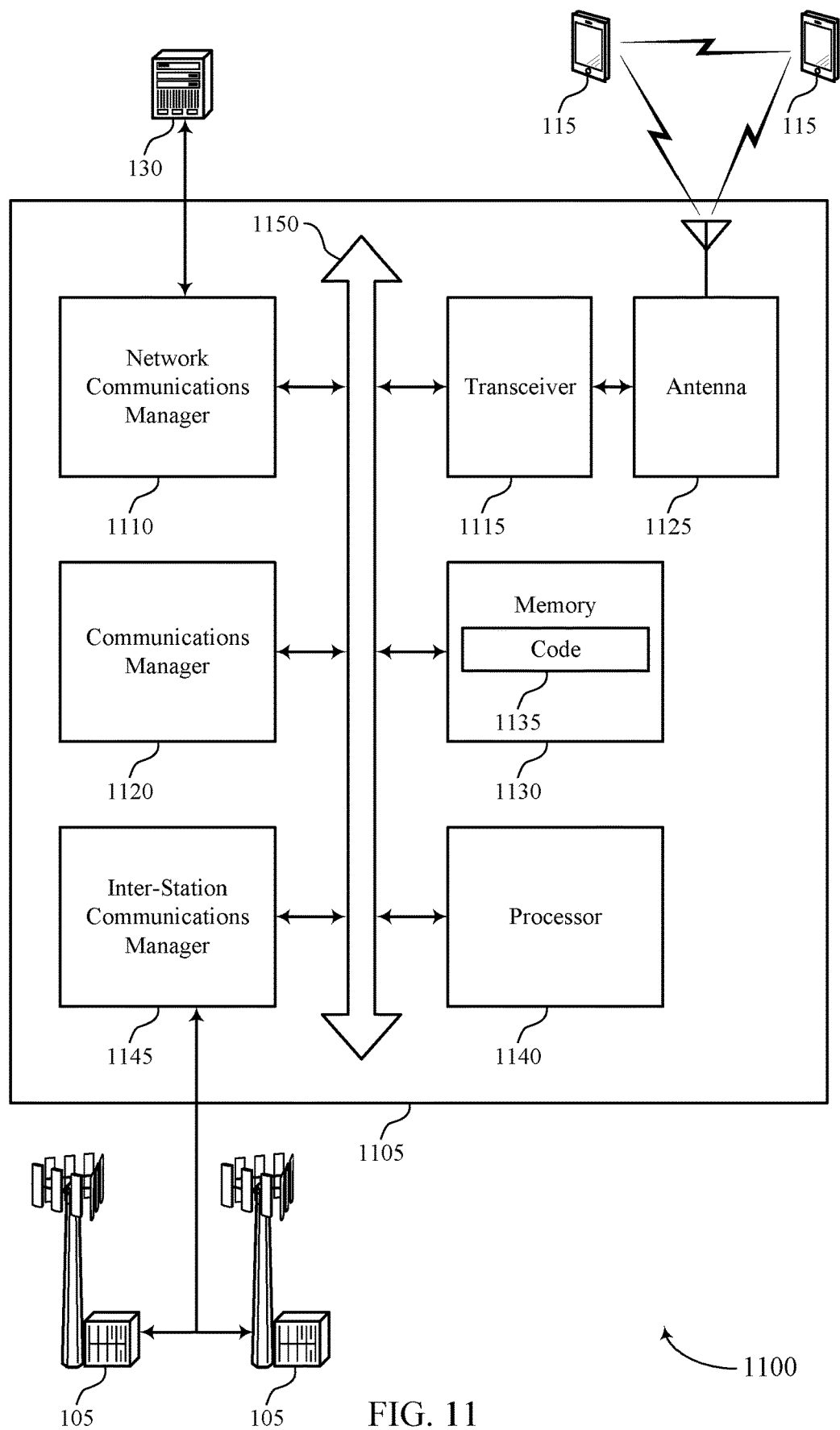
FIG. 11 shows a diagram of a system including a base station that supports mesh connectivity in integrated access and backhaul networks in accordance with aspects of the present disclosure.

FIG. 11 shows a diagram of a system 1100 including a device 1105 that supports mesh connectivity in integrated access and backhaul networks in accordance with aspects of the present disclosure. The device 1105 may be an example of or include the components of a device 705, a device 805, or a base station 105 as described herein. The device 1105 may communicate wirelessly with one or more base stations 105, UEs 115, or any combination thereof. The device 1105 may include components for bi-directional voice and data communications including components for transmitting and receiving communications, such as a communications manager 1120, a network communications manager 1110, a transceiver 1115, an antenna 1125, a memory 1130, code 1135, a processor 1140, and an inter-station communications manager 1145. These components may be in electronic communication or otherwise coupled (e.g., operatively, communicatively, functionally, electronically, electrically) via one or more buses (e.g., a bus 1150).

The network communications manager 1110 may manage communications with a core network 130 (e.g., via one or more wired backhaul links). For example, the network communications manager 1110 may manage the transfer of data communications for client devices, such as one or more UEs 115.

In some cases, the device 1105 may include a single antenna 1125. However, in some other cases the device 1105 may have more than one antenna 1125, which may be capable of concurrently transmitting or receiving multiple wireless transmissions. The transceiver 1115 may communicate bi-directionally, via the one or more antennas 1125, wired, or wireless links as described herein. For example, the transceiver 1115 may represent a wireless transceiver and may communicate bi-directionally with another wireless transceiver. The transceiver 1115 may also include a modem to modulate the packets, to provide the modulated packets to one or more antennas 1125 for transmission, and to demodulate packets received from the one or more antennas 1125. The transceiver 1115, or the transceiver 1115 and one or more antennas 1125, may be an example of a transmitter 715, a transmitter 815, a receiver 710, a receiver 810, or any combination thereof or component thereof, as described herein.

The memory 1130 may include RAM and ROM. The memory 1130 may store computer-readable, computer-executable code 1135 including instructions that, when executed by the processor 1140, cause the device 1105 to perform various functions described herein. The code 1135 may be stored in a non-transitory computer-readable medium such as system memory or another type of memory. In some cases, the code 1135 may not be directly executable by the processor 1140 but may cause a computer (e.g., when compiled and executed) to perform functions described herein. In some cases, the memory 1130 may contain, among other things, a BIOS which may control basic hardware or software operation such as the interaction with peripheral components or devices.

The processor 1140 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In some other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting mesh connectivity in integrated access and backhaul networks). For example, the device 1105 or a component of the device 1105 may include a processor 1140 and memory 1130 coupled to the processor 1140, the processor 1140 and memory 1130 configured to perform various functions described herein.

The inter-station communications manager 1145 may manage communications with other base stations 105, and may include a controller or scheduler for controlling communications with UEs 115 in cooperation with other base stations 105. For example, the inter-station communications manager 1145 may coordinate scheduling for transmissions to UEs 115 for various interference mitigation techniques such as beamforming or joint transmission. In some examples, the inter-station communications manager 1145 may provide an X2 interface within an LTE/LTE-A wireless communications network technology to provide communication between base stations 105.

The communications manager 1120 may support wireless communications in accordance with examples as disclosed herein. For example, the communications manager 1120 may be configured as or otherwise support a means for receiving, at a first wireless node of an integrated access and backhaul network, an indication of a routing address of a second wireless node of the integrated access and backhaul network that is associated with a discovery signal transmitted by the second wireless node. The communications manager 1120 may be configured as or otherwise support a means for transmitting a first message to the second wireless node using the routing address of the second wireless node, where the first message is transmitted via at least a third wireless node of the integrated access and backhaul network and provides information related to coordination of wireless communications of the first wireless node and the second wireless node.

Additionally or alternatively, the communications manager 1120 may support wireless communications in accordance with examples as disclosed herein. For example, the communications manager 1120 may be configured as or otherwise support a means for transmitting, from a second wireless node of an integrated access and backhaul network to one or more other wireless nodes of the integrated access and backhaul network, an indication of an association between a routing address of the second wireless node and a discovery signal transmitted by the second wireless node. The communications manager 1120 may be configured as or otherwise support a means for receiving, from a first wireless node of the integrated access and backhaul network, a first message using the routing address of the second wireless node, where the first message is transmitted via at least a third wireless node of the integrated access and backhaul network and includes information related to coordination of wireless communications of the first wireless node and the second wireless node.

By including or configuring the communications manager 1120 in accordance with examples as described herein, the device 1105 may support techniques for determination of routing addresses for mesh connectivity between network nodes, which may allow for support of distributed algorithms for topology discovery, routing, load-balancing, resource coordination, or any combinations thereof, without involvement of a central or control node of the network, thereby enhancing communications efficiency and reliability.

In some examples, the communications manager 1120 may be configured to perform various operations (e.g., receiving, monitoring, transmitting) using or otherwise in cooperation with the transceiver 1115, the one or more antennas 1125, or any combination thereof. Although the communications manager 1120 is illustrated as a separate component, in some examples, one or more functions described with reference to the communications manager 1120 may be supported by or performed by the processor 1140, the memory 1130, the code 1135, or any combination thereof. For example, the code 1135 may include instructions executable by the processor 1140 to cause the device 1105 to perform various aspects of mesh connectivity in integrated access and backhaul networks as described herein, or the processor 1140 and the memory 1130 may be otherwise configured to perform or support such operations.

Figure 12:
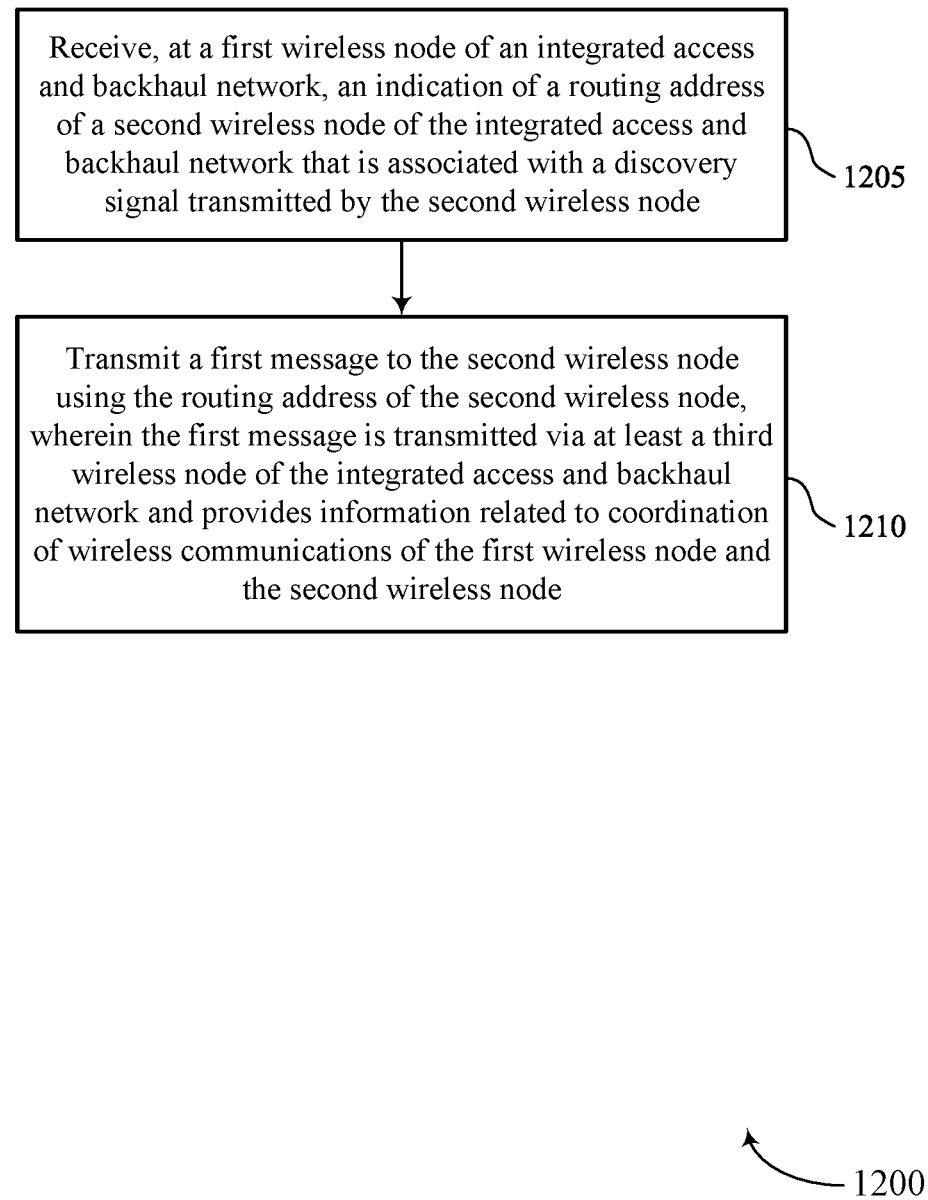
FIGS. 12 through 17 show flowcharts illustrating methods that support mesh connectivity in integrated access and backhaul networks in accordance with aspects of the present disclosure.

FIG. 12 shows a flowchart illustrating a method 1200 that supports mesh connectivity in integrated access and backhaul networks in accordance with aspects of the present disclosure. The operations of the method 1200 may be implemented by a UE or a base station or its components as described herein. For example, the operations of the method 1200 may be performed by a UE 115 or a base station 105 as described with reference to FIGS. 1 through 11. In some examples, a UE or a base station may execute a set of instructions to control the functional elements of the UE or the base station to perform the described functions. Additionally or alternatively, the UE or the base station may perform aspects of the described functions using special-purpose hardware.

At 1205, the method may include receiving, at a first wireless node of an integrated access and backhaul network, an indication of a routing address of a second wireless node of the integrated access and backhaul network that is associated with a discovery signal transmitted by the second wireless node. The operations of 1205 may be performed in accordance with examples as disclosed herein. In some examples, aspects of the operations of 1205 may be performed by a routing address manager 925 as described with reference to FIG. 9.

At 1210, the method may include transmitting a first message to the second wireless node using the routing address of the second wireless node, where the first message is transmitted via at least a third wireless node of the integrated access and backhaul network and provides information related to coordination of wireless communications of the first wireless node and the second wireless node. The operations of 1210 may be performed in accordance with examples as disclosed herein. In some examples, aspects of the operations of 1210 may be performed by a mesh connectivity manager 930 as described with reference to FIG. 9.

Figure 13:
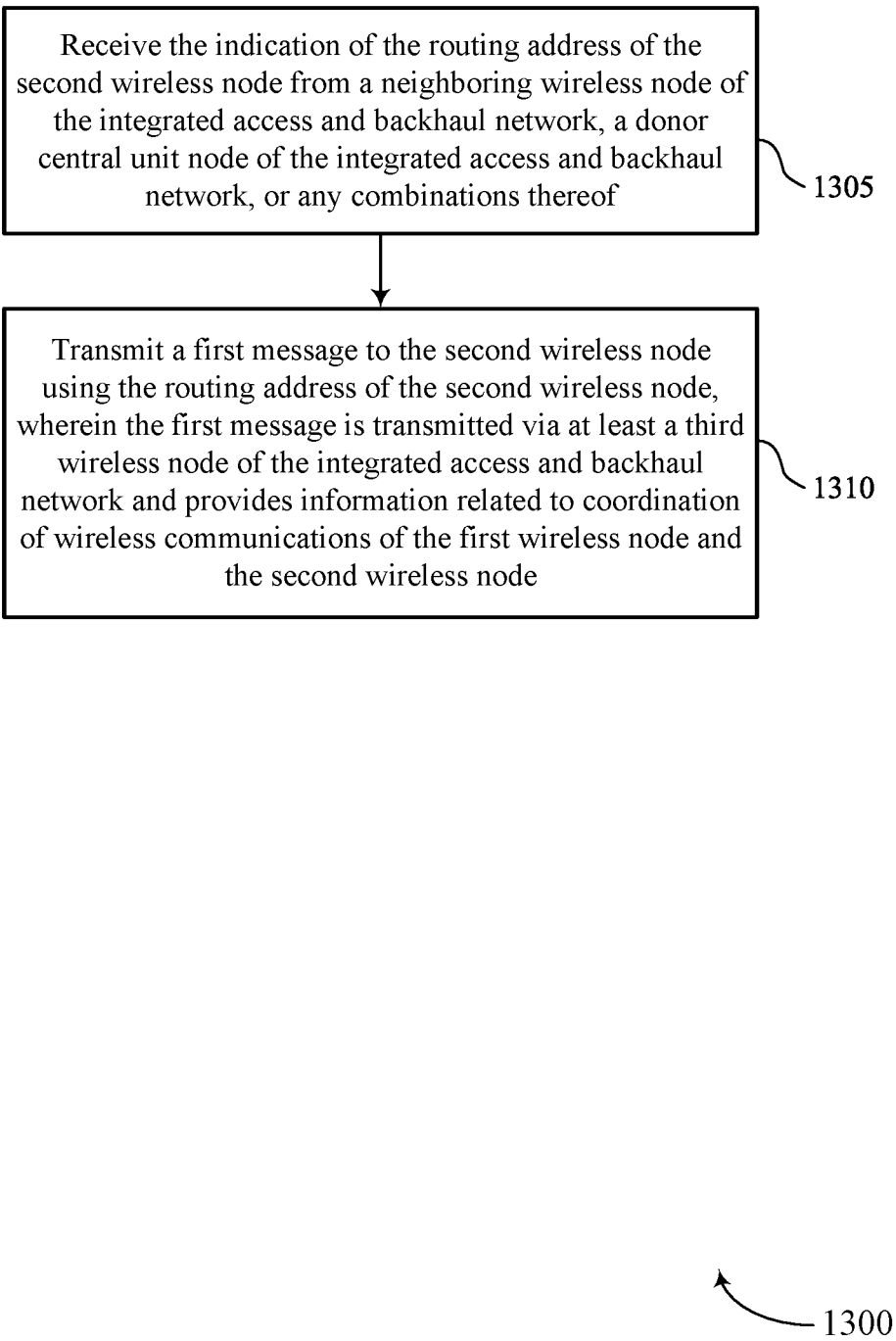

FIG. 13 shows a flowchart illustrating a method 1300 that supports mesh connectivity in integrated access and backhaul networks in accordance with aspects of the present disclosure. The operations of the method 1300 may be implemented by a UE or a base station or its components as described herein. For example, the operations of the method 1300 may be performed by a UE 115 or a base station 105 as described with reference to FIGS. 1 through 11. In some examples, a UE or a base station may execute a set of instructions to control the functional elements of the UE or the base station to perform the described functions. Additionally or alternatively, the UE or the base station may perform aspects of the described functions using special-purpose hardware.

At 1305, the method may include receiving the indication of the routing address of the second wireless node from a neighboring wireless node of the integrated access and backhaul network, a donor central unit node of the integrated access and backhaul network, or any combinations thereof. The operations of 1305 may be performed in accordance with examples as disclosed herein. In some examples, aspects of the operations of 1305 may be performed by a routing address manager 925 as described with reference to FIG. 9.

At 1310, the method may include transmitting a first message to the second wireless node using the routing address of the second wireless node, where the first message is transmitted via at least a third wireless node of the integrated access and backhaul network and provides information related to coordination of wireless communications of the first wireless node and the second wireless node. The operations of 1310 may be performed in accordance with examples as disclosed herein. In some examples, aspects of the operations of 1310 may be performed by a mesh connectivity manager 930 as described with reference to FIG. 9.

Figure 14:
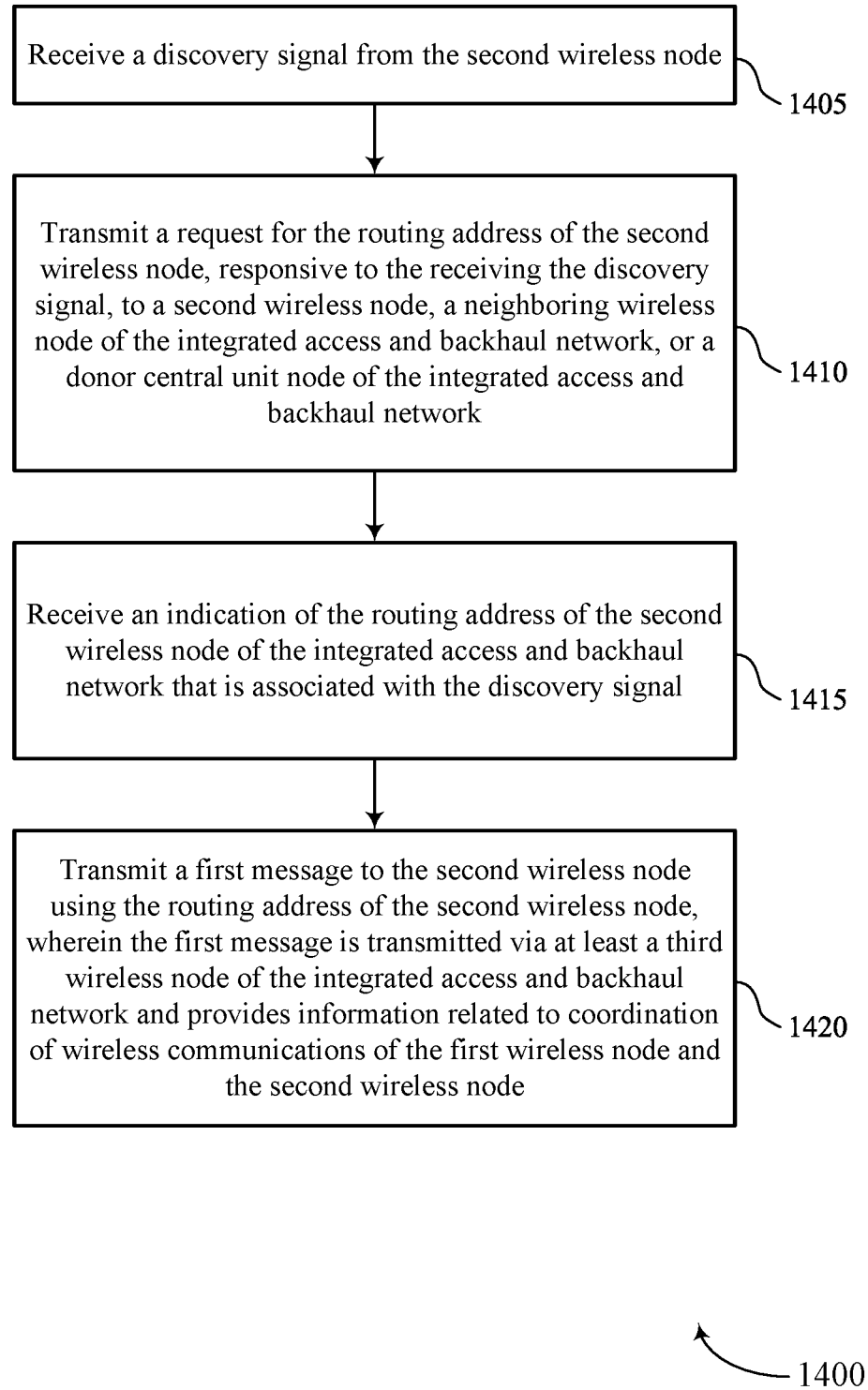

FIG. 14 shows a flowchart illustrating a method 1400 that supports mesh connectivity in integrated access and backhaul networks in accordance with aspects of the present disclosure. The operations of the method 1400 may be implemented by a UE or a base station or its components as described herein. For example, the operations of the method 1400 may be performed by a UE 115 or a base station 105 as described with reference to FIGS. 1 through 11. In some examples, a UE or a base station may execute a set of instructions to control the functional elements of the UE or the base station to perform the described functions. Additionally or alternatively, the UE or the base station may perform aspects of the described functions using special-purpose hardware.

At 1405, the method may include receiving a discovery signal from a second wireless node. The operations of 1405 may be performed in accordance with examples as disclosed herein. In some examples, aspects of the operations of 1405 may be performed by a discovery signal manager 935 as described with reference to FIG. 9.

At 1410, the method may include transmitting a request for a routing address of the second wireless node, responsive to the receiving the discovery signal, to a second wireless node, a neighboring wireless node of the integrated access and backhaul network, or a donor central unit node of the integrated access and backhaul network. The operations of 1410 may be performed in accordance with examples as disclosed herein. In some examples, aspects of the operations of 1410 may be performed by a mesh connectivity manager 930 as described with reference to FIG. 9.

At 1415, the method may include receiving an indication of the routing address of a second wireless node of the integrated access and backhaul network that is associated with a discovery signal. The operations of 1415 may be performed in accordance with examples as disclosed herein. In some examples, aspects of the operations of 1415 may be performed by a routing address manager 925 as described with reference to FIG. 9.

At 1420, the method may include transmitting a first message to the second wireless node using the routing address of the second wireless node, where the first message is transmitted via at least a third wireless node of the integrated access and backhaul network and provides information related to coordination of wireless communications of the first wireless node and the second wireless node. The operations of 1420 may be performed in accordance with examples as disclosed herein. In some examples, aspects of the operations of 1420 may be performed by a mesh connectivity manager 930 as described with reference to FIG. 9.

Figure 15:
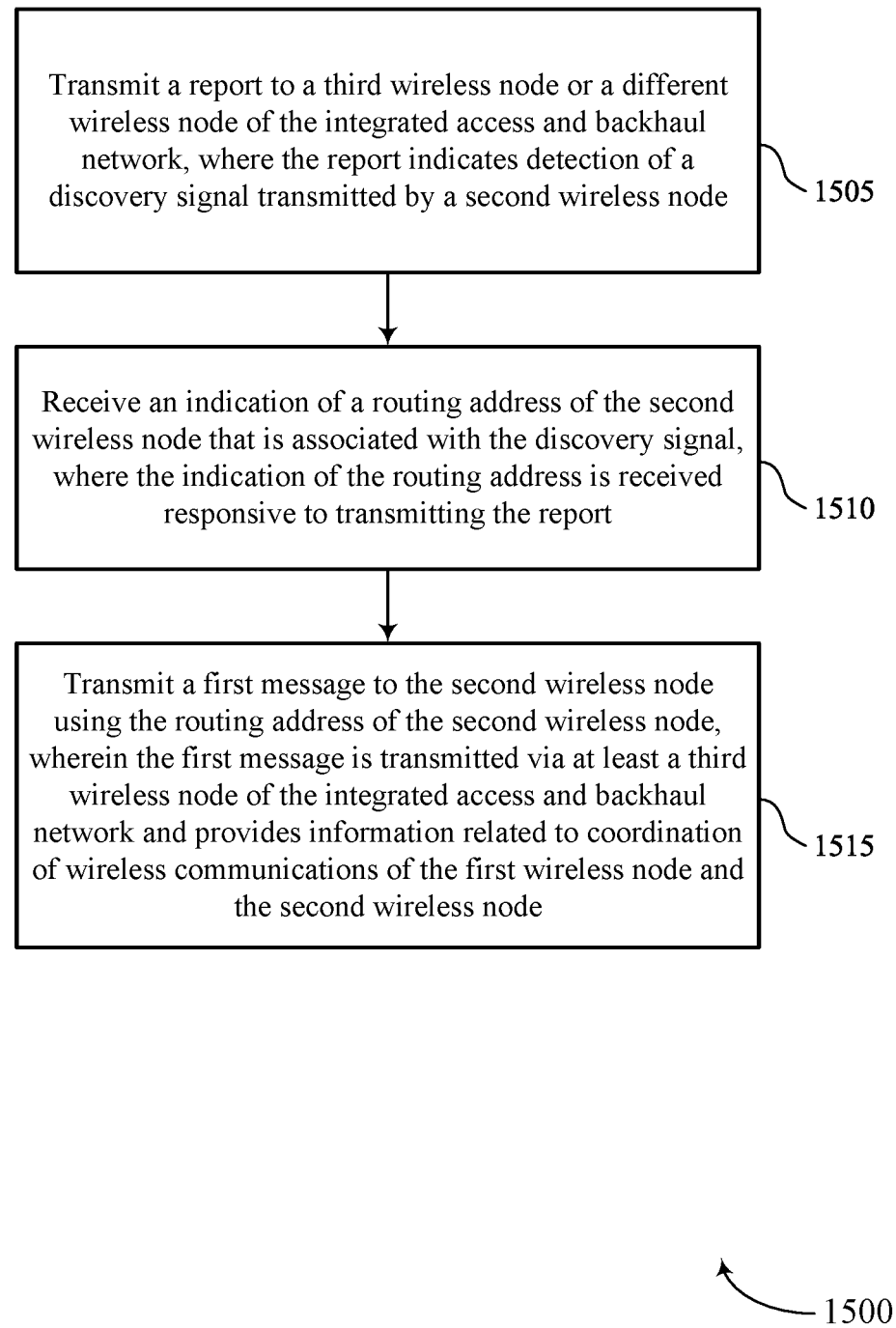

FIG. 15 shows a flowchart illustrating a method 1500 that supports mesh connectivity in integrated access and backhaul networks in accordance with aspects of the present disclosure. The operations of the method 1500 may be implemented by a UE or a base station or its components as described herein. For example, the operations of the method 1500 may be performed by a UE 115 or a base station 105 as described with reference to FIGS. 1 through 11. In some examples, a UE or a base station may execute a set of instructions to control the functional elements of the UE or the base station to perform the described functions. Additionally or alternatively, the UE or the base station may perform aspects of the described functions using special-purpose hardware.

At 1505, the method may include transmitting a report to a third wireless node or a different wireless node of the integrated access and backhaul network, where the report indicates detection of a discovery signal transmitted by a second wireless node. The operations of 1505 may be performed in accordance with examples as disclosed herein. In some examples, aspects of the operations of 1505 may be performed by a discovery signal manager 935 as described with reference to FIG. 9.

At 1510, the method may include receiving an indication of a routing address of the second wireless node that is associated with the discovery signal transmitted by the second wireless node and where the indication of the routing address is received responsive to transmitting the report. The operations of 1510 may be performed in accordance with examples as disclosed herein. In some examples, aspects of the operations of 1510 may be performed by a routing address manager 925 as described with reference to FIG. 9.

At 1515, the method may include transmitting a first message to the second wireless node using the routing address of the second wireless node, where the first message is transmitted via at least a third wireless node of the integrated access and backhaul network and provides information related to coordination of wireless communications of the first wireless node and the second wireless node. The operations of 1515 may be performed in accordance with examples as disclosed herein. In some examples, aspects of the operations of 1515 may be performed by a mesh connectivity manager 930 as described with reference to FIG. 9.

Figure 16:
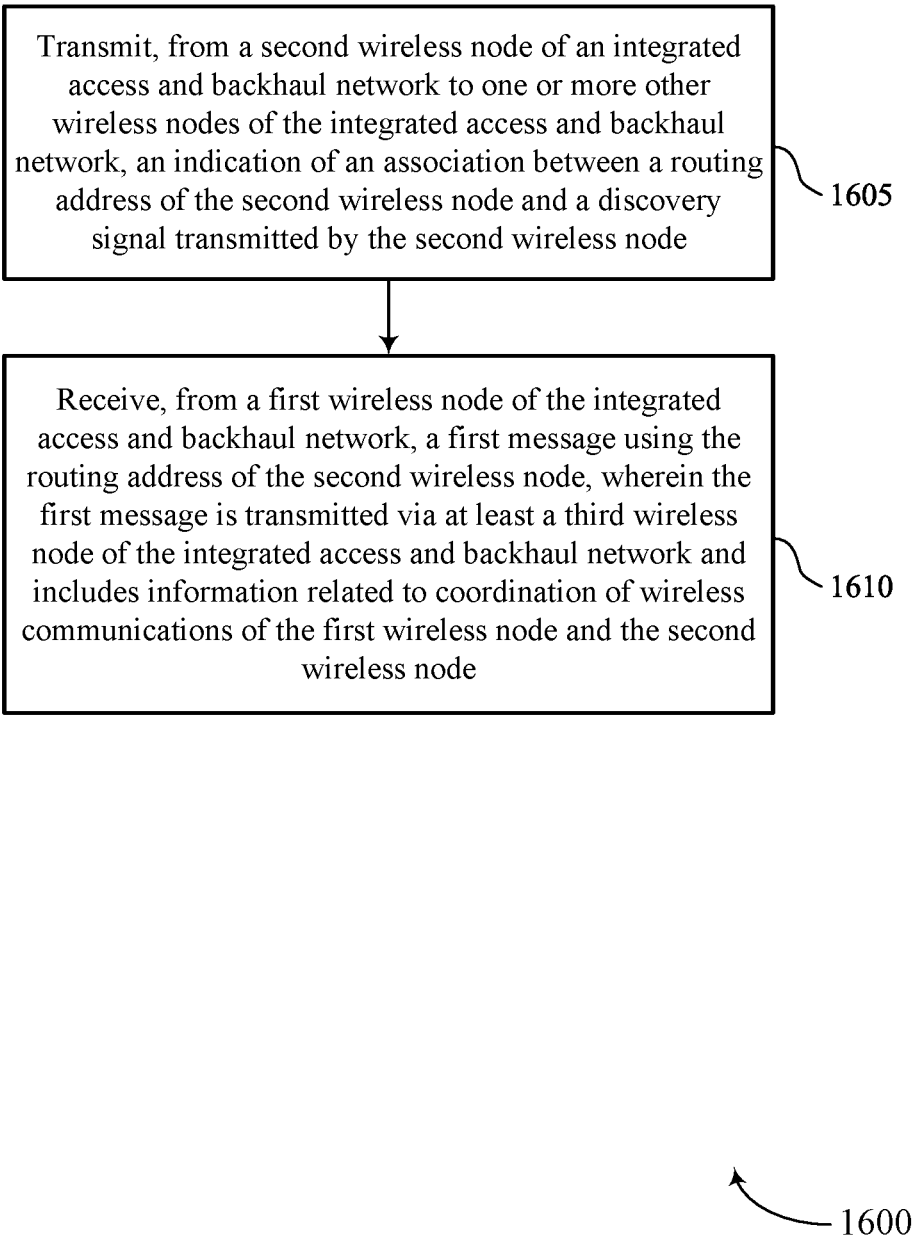

FIG. 16 shows a flowchart illustrating a method 1600 that supports mesh connectivity in integrated access and backhaul networks in accordance with aspects of the present disclosure. The operations of the method 1600 may be implemented by a UE or a base station or its components as described herein. For example, the operations of the method 1600 may be performed by a UE 115 or a base station 105 as described with reference to FIGS. 1 through 11. In some examples, a UE or a base station may execute a set of instructions to control the functional elements of the UE or the base station to perform the described functions. Additionally or alternatively, the UE or the base station may perform aspects of the described functions using special-purpose hardware.

At 1605, the method may include transmitting, from a second wireless node of an integrated access and backhaul network to one or more other wireless nodes of the integrated access and backhaul network, an indication of an association between a routing address of the second wireless node and a discovery signal transmitted by the second wireless node. The operations of 1605 may be performed in accordance with examples as disclosed herein. In some examples, aspects of the operations of 1605 may be performed by a routing address manager 925 as described with reference to FIG. 9.

At 1610, the method may include receiving, from a first wireless node of the integrated access and backhaul network, a first message using the routing address of the second wireless node, where the first message is transmitted via at least a third wireless node of the integrated access and backhaul network and includes information related to coordination of wireless communications of the first wireless node and the second wireless node. The operations of 1610 may be performed in accordance with examples as disclosed herein. In some examples, aspects of the operations of 1610 may be performed by a mesh connectivity manager 930 as described with reference to FIG. 9.

Figure 17:
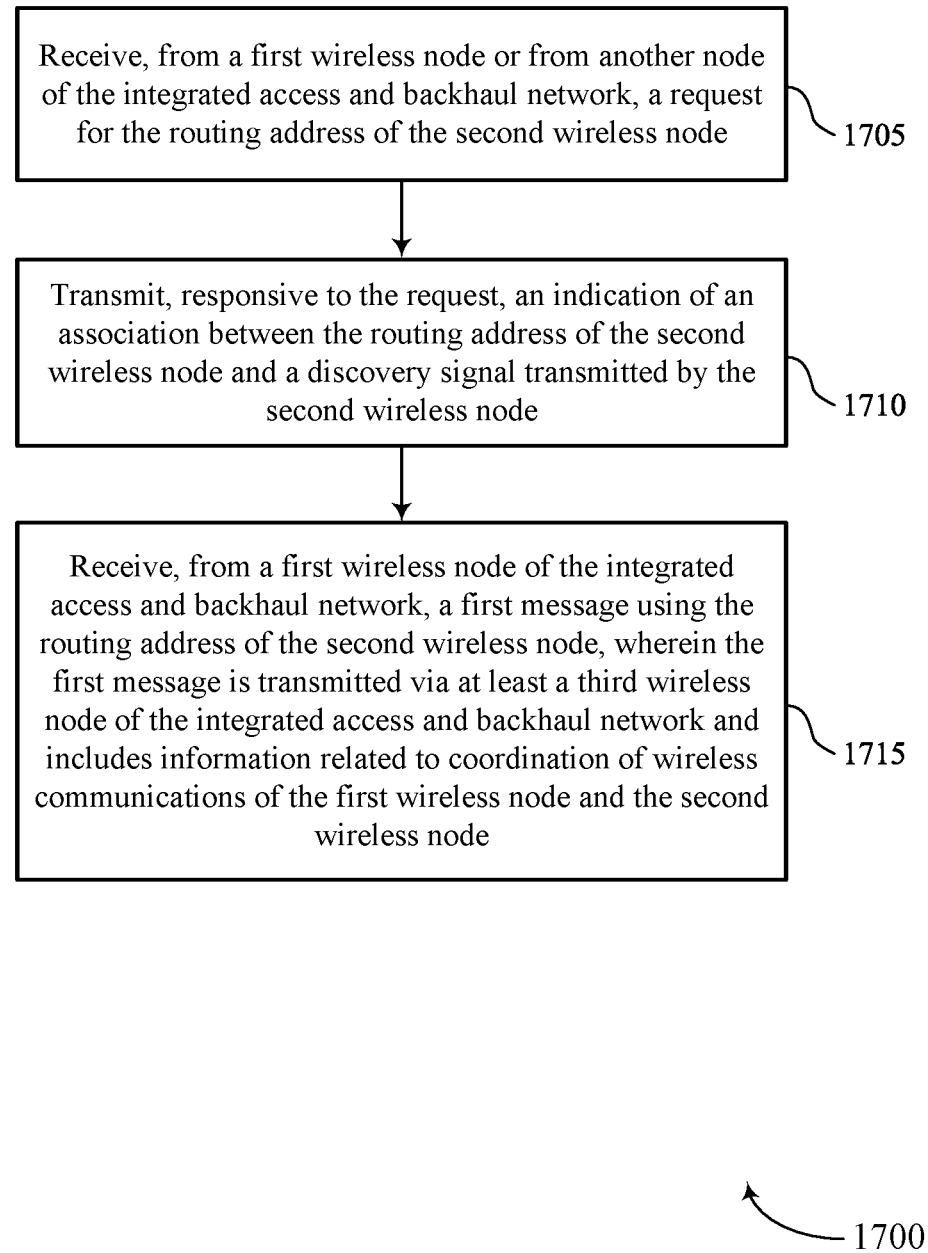

FIG. 17 shows a flowchart illustrating a method 1700 that supports mesh connectivity in integrated access and backhaul networks in accordance with aspects of the present disclosure. The operations of the method 1700 may be implemented by a UE or a base station or its components as described herein. For example, the operations of the method 1700 may be performed by a UE 115 or a base station 105 as described with reference to FIGS. 1 through 11. In some examples, a UE or a base station may execute a set of instructions to control the functional elements of the UE or the base station to perform the described functions. Additionally or alternatively, the UE or the base station may perform aspects of the described functions using special-purpose hardware.

At 1705, the method may include receiving, from a first wireless node or from another node of the integrated access and backhaul network, a request for the routing address of the second wireless node. The operations of 1705 may be performed in accordance with examples as disclosed herein. In some examples, aspects of the operations of 1705 may be performed by a routing address manager 925 as described with reference to FIG. 9.

At 1710, the method may include transmitting, responsive to the request, an indication of an association between a routing address of the second wireless node and a discovery signal transmitted by the second wireless node. The operations of 1710 may be performed in accordance with examples as disclosed herein. In some examples, aspects of the operations of 1710 may be performed by a routing address manager 925 as described with reference to FIG. 9.

At 1715, the method may include receiving, from a first wireless node of the integrated access and backhaul network, a first message using the routing address of the second wireless node, where the first message is transmitted via at least a third wireless node of the integrated access and backhaul network and includes information related to coordination of wireless communications of the first wireless node and the second wireless node. The operations of 1715 may be performed in accordance with examples as disclosed herein. In some examples, aspects of the operations of 1715 may be performed by a mesh connectivity manager 930 as described with reference to FIG. 9.

It should be noted that the methods described herein describe possible implementations, and that the operations and the steps may be rearranged or otherwise modified and that other implementations are possible. Further, aspects from two or more of the methods may be combined.

The following aspects are given by way of illustration. Examples of the following aspects may be combined with examples or embodiments shown or discussed in relation to the figures or elsewhere herein.

Aspect 1: A method for wireless communications, comprising: receiving, at a first wireless node of an integrated access and backhaul network, an indication of a routing address of a second wireless node of the integrated access and backhaul network that is associated with a discovery signal transmitted by the second wireless node; and transmitting a first message to the second wireless node using the routing address of the second wireless node, wherein the first message is transmitted via at least a third wireless node of the integrated access and backhaul network and provides information related to coordination of wireless communications of the first wireless node and the second wireless node.

Aspect 2: The method of aspect 1, wherein the receiving comprises: receiving the indication of the routing address of the second wireless node from a neighboring wireless node of the integrated access and backhaul network, a donor central unit node of the integrated access and backhaul network, or any combinations thereof.

Aspect 3: The method of any of aspects 1 through 2, further comprising: receiving the discovery signal from the second wireless node; and transmitting a request for the routing address of the second wireless node responsive to the receiving the discovery signal, wherein the request is transmitted to the second wireless node, a neighboring wireless node of the integrated access and backhaul network, or a donor central unit node of the integrated access and backhaul network.

Aspect 4: The method of any of aspects 1 through 3, wherein the indication of the routing address of the second wireless node is received via a sidelink communications connection between the first wireless node and the second wireless node.

Aspect 5: The method of any of aspects 1 through 4, further comprising: transmitting a report to the third wireless node or a different wireless node of the integrated access and backhaul network, wherein the report indicates detection of the discovery signal transmitted by the second wireless node, and wherein the indication of the routing address is received responsive to transmitting the report.

Aspect 6: The method of any of aspects 1 through 5, wherein the discovery signal transmitted by the second wireless node includes a system information block of the second wireless node.

Aspect 7: The method of any of aspects 1 through 6, further comprising: transmitting an indication of the routing address of the second wireless node to one or more other wireless nodes of the integrated access and backhaul network.

Aspect 8: The method of aspect 7, wherein the transmitting the indication of the routing address is performed based at least in part on a configuration received from a central unit node of the integrated access and backhaul network.

Aspect 9: The method of any of aspects 1 through 8, wherein the discovery signal is one or more of a synchronization signal, broadcast channel, a synchronization signal block (SSB), an SIB, or any combinations thereof, transmitted by the second wireless node.

Aspect 10: The method of any of aspects 1 through 9, wherein the discovery signal includes a cell identifier, and wherein the routing address of the second wireless node is associated with the cell identifier of the discovery signal.

Aspect 11: The method of any of aspects 1 through 10, wherein the routing address of the second wireless node is an internet protocol (IP) address or a backhaul adaptation protocol (BAP) address.

Aspect 12: The method of any of aspects 1 through 11, wherein the first message is transmitted to the second wireless node using one or more of Internet protocol (IP) communications, backhaul adaptation protocol (BAP) communications, a medium access control (MAC) control element of a wireless communications protocol, a DCI transmission of the wireless communications protocol, or any combinations thereof.

Aspect 13: The method of any of aspects 1 through 12, wherein the discovery signal includes a cell identifier, and wherein a plurality of cell identifiers are associated with the routing address of the second wireless node.

Aspect 14: A method for wireless communications, comprising: transmitting, from a second wireless node of an integrated access and backhaul network to one or more other wireless nodes of the integrated access and backhaul network, an indication of an association between a routing address of the second wireless node and a discovery signal transmitted by the second wireless node; and receiving, from a first wireless node of the integrated access and backhaul network, a first message using the routing address of the second wireless node, wherein the first message is transmitted via at least a third wireless node of the integrated access and backhaul network and includes information related to coordination of wireless communications of the first wireless node and the second wireless node.

Aspect 15: The method of aspect 14, wherein the transmitting is performed based at least in part on a configuration received from a central unit node of the integrated access and backhaul network.

Aspect 16: The method of any of aspects 14 through 15, wherein the indication of the association between the routing address and the discovery signal is transmitted by the second wireless node to the third wireless node or a different wireless node of the integrated access and backhaul network for providing the first wireless node with the routing address that is associated with the discovery signal.

Aspect 17: The method of any of aspects 14 through 16, further comprising: receiving, from the first wireless node or from another node of the integrated access and backhaul network, a request for the routing address of the second wireless node, and wherein the indication of the association between the routing address of the second wireless node and the discovery signal is transmitted based on the request.

Aspect 18: The method of any of aspects 14 through 17, wherein the indication of the routing address of the second wireless node is transmitted via a sidelink communications connection between the first wireless node and the second wireless node.

Aspect 19: The method of any of aspects 14 through 18, wherein the discovery signal is one or more of a synchronization signal, broadcast channel, a synchronization signal block (SSB), an SIB, or any combinations thereof, transmitted by the second wireless node.

Aspect 20: The method of any of aspects 14 through 19, wherein the discovery signal includes a cell identifier, and wherein the routing address of the second wireless node is associated with the cell identifier of the discovery signal.

Aspect 21: The method of any of aspects 14 through 20, wherein the routing address of the second wireless node is an internet protocol (IP) address or a backhaul adaptation protocol (BAP) address.

Aspect 22: The method of any of aspects 14 through 21, wherein the first message is transmitted to the second wireless node using one or more of Internet protocol (IP) communications, backhaul adaptation protocol (BAP) communications, a medium access control (MAC) control element of a wireless communications protocol, a DCI transmission of the wireless communications protocol, or any combinations thereof.

Aspect 23: The method of any of aspects 14 through 22, wherein the discovery signal includes a cell identifier, and wherein a plurality of cell identifiers are associated with the routing address of the second wireless node.

Aspect 24: An apparatus for wireless communications, comprising a processor; memory coupled with the processor; and instructions stored in the memory and executable by the processor to cause the apparatus to perform a method of any of aspects 1 through 13.

Aspect 25: An apparatus for wireless communications, comprising at least one means for performing a method of any of aspects 1 through 13.

Aspect 26: A non-transitory computer-readable medium storing code for wireless communications, the code comprising instructions executable by a processor to perform a method of any of aspects 1 through 13.

Aspect 27: An apparatus for wireless communications, comprising a processor; memory coupled with the processor; and instructions stored in the memory and executable by the processor to cause the apparatus to perform a method of any of aspects 14 through 23.

Aspect 28: An apparatus for wireless communications, comprising at least one means for performing a method of any of aspects 14 through 23.

Aspect 29: A non-transitory computer-readable medium storing code for wireless communications, the code comprising instructions executable by a processor to perform a method of any of aspects 14 through 23.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communications, comprising:
 a processor;
 memory coupled with the processor; and
 instructions stored in the memory and executable by the processor to cause the apparatus to:
  transmit, from a first wireless node of an integrated access and backhaul network, a request for a routing address of a second wireless node;
  receive, at the first wireless node of the integrated access and backhaul network, an indication of the routing address of the second wireless node of the integrated access and backhaul network that is associated with a discovery signal transmitted by the second wireless node, wherein the indication of the routing address of the second wireless node that is associated with the discovery signal is transmitted based on the request; and
  transmit a first message to the second wireless node using the routing address of the second wireless node, wherein the first message is transmitted via at least a third wireless node of the integrated access and backhaul network and provides information related to coordination of wireless communications of the first wireless node and the second wireless node.

2. The apparatus of claim 1, wherein the instructions are further executable by the processor to cause the apparatus to:
 receive the indication of the routing address of the second wireless node from a neighboring wireless node of the integrated access and backhaul network, a donor central unit node of the integrated access and backhaul network, or any combinations thereof.

3. The apparatus of claim 1, wherein the instructions are further executable by the processor to cause the apparatus to:
 receive the discovery signal from the second wireless node; and
 transmit a request for the routing address of the second wireless node responsive to the receiving the discovery signal, wherein the request is transmitted to the second wireless node, a neighboring wireless node of the integrated access and backhaul network, or a donor central unit node of the integrated access and backhaul network.

4. The apparatus of claim 1, wherein the indication of the routing address of the second wireless node is received via a sidelink communications connection between the first wireless node and the second wireless node.

5. The apparatus of claim 1, wherein the instructions are further executable by the processor to cause the apparatus to:
 transmit a report to the third wireless node or a different wireless node of the integrated access and backhaul network, wherein the report indicates detection of the discovery signal transmitted by the second wireless node, and wherein the indication of the routing address is received responsive to transmitting the report.

6. The apparatus of claim 1, wherein the discovery signal transmitted by the second wireless node includes a system information block of the second wireless node.

7. The apparatus of claim 1, wherein the instructions are further executable by the processor to cause the apparatus to:
 transmit an indication of the routing address of the second wireless node to one or more other wireless nodes of the integrated access and backhaul network.

8. The apparatus of claim 7, wherein the indication of the routing address is transmitted based at least in part on a configuration received from a central unit node of the integrated access and backhaul network.

9. The apparatus of claim 1, wherein the discovery signal is one or more of a synchronization signal, broadcast channel, a synchronization signal block (SSB), a system information block (SIB), or any combinations thereof, transmitted by the second wireless node.

10. The apparatus of claim 1, wherein the discovery signal includes a cell identifier, and wherein the routing address of the second wireless node is associated with the cell identifier of the discovery signal.

11. The apparatus of claim 1, wherein the routing address of the second wireless node is an internet protocol (IP) address or a backhaul adaptation protocol (BAP) address.

12. The apparatus of claim 1, wherein the first message is transmitted to the second wireless node using one or more of Internet protocol (IP) communications, backhaul adaptation protocol (BAP) communications, a medium access control (MAC) control element of a wireless communications protocol, a downlink control information (DCI) transmission of the wireless communications protocol, or any combinations thereof.

13. The apparatus of claim 1, wherein the discovery signal includes a cell identifier, and wherein a plurality of cell identifiers are associated with the routing address of the second wireless node.

14. An apparatus for wireless communications, comprising:
a processor;
memory coupled with the processor; and
instructions stored in the memory and executable by the processor to cause the apparatus to:
receive, from a first wireless node or from another node of an integrated access and backhaul network, a request for a routing address of a second wireless node;
transmit, from the second wireless node of the integrated access and backhaul network to one or more other wireless nodes of the integrated access and backhaul network, an indication of an association between the routing address of the second wireless node and a discovery signal transmitted by the second wireless node, and wherein the indication of the association between the routing address of the second wireless node and the discovery signal is transmitted based on the request; and
receive, from the first wireless node of the integrated access and backhaul network, a first message using the routing address of the second wireless node, wherein the first message is transmitted via at least a third wireless node of the integrated access and backhaul network and includes information related to coordination of wireless communications of the first wireless node and the second wireless node.

15. The apparatus of claim 14, wherein the indication of the association between the routing address of the second wireless node and the discovery signal transmitted by the second wireless node is provided based at least in part on a configuration received from a central unit node of the integrated access and backhaul network.

16. The apparatus of claim 14, wherein the indication of the association between the routing address and the discovery signal is transmitted by the second wireless node to the third wireless node or a different wireless node of the integrated access and backhaul network for providing the first wireless node with the routing address that is associated with the discovery signal.

17. The apparatus of claim 14, wherein the indication of the routing address of the second wireless node is transmitted via a sidelink communications connection between the first wireless node and the second wireless node.

18. The apparatus of claim 14, wherein the discovery signal is one or more of a synchronization signal, broadcast channel, a synchronization signal block (SSB), a system information block (SIB), or any combinations thereof, transmitted by the second wireless node.

19. The apparatus of claim 14, wherein the discovery signal includes a cell identifier, and wherein the routing address of the second wireless node is associated with the cell identifier of the discovery signal.

20. The apparatus of claim 14, wherein the routing address of the second wireless node is an internet protocol (IP) address or a backhaul adaptation protocol (BAP) address.

21. The apparatus of claim 14, wherein the first message is transmitted to the second wireless node using one or more of Internet protocol (IP) communications, backhaul adaptation protocol (BAP) communications, a medium access control (MAC) control element of a wireless communications protocol, a downlink control information (DCI) transmission of the wireless communications protocol, or any combinations thereof.

22. The apparatus of claim 14, wherein the discovery signal includes a cell identifier, and wherein a plurality of cell identifiers are associated with the routing address of the second wireless node.

23. A method for wireless communications, comprising:
transmitting, from a first wireless node of an integrated access and backhaul network, a request for a routing address of a second wireless node;
receiving, at the first wireless node of the integrated access and backhaul network, an indication of the routing address of the second wireless node of the integrated access and backhaul network that is associated with a discovery signal transmitted by the second wireless node, wherein the indication of the routing address of the second wireless node that is associated with the discovery signal is transmitted based on the request; and
transmitting a first message to the second wireless node using the routing address of the second wireless node, wherein the first message is transmitted via at least a third wireless node of the integrated access and backhaul network and provides information related to coordination of wireless communications of the first wireless node and the second wireless node.

24. The method of claim 23, wherein the receiving comprises:
receiving the indication of the routing address of the second wireless node from a neighboring wireless node of the integrated access and backhaul network, a donor central unit node of the integrated access and backhaul network, or any combinations thereof.

25. The method of claim 23, further comprising:
receiving the discovery signal from the second wireless node; and
transmitting a request for the routing address of the second wireless node responsive to the receiving the discovery signal, wherein the request is transmitted to the second wireless node, a neighboring wireless node of the integrated access and backhaul network, or a donor central unit node of the integrated access and backhaul network.

26. The method of claim 23, wherein the indication of the routing address of the second wireless node is received via a sidelink communications connection between the first wireless node and the second wireless node.

27. A method for wireless communications, comprising:
receiving, from a first wireless node or from another node of an integrated access and backhaul network, a request for a routing address of a second wireless node;

transmitting, from the second wireless node of the integrated access and backhaul network to one or more other wireless nodes of the integrated access and backhaul network, an indication of an association between the routing address of the second wireless node and a discovery signal transmitted by the second wireless node, and wherein the indication of the association between the routing address of the second wireless node and the discovery signal is transmitted based on the request; and receiving, from a first wireless node of the integrated access and backhaul network, a first message using the routing address of the second wireless node, wherein the first message is transmitted via at least a third wireless node of the integrated access and backhaul network and includes information related to coordination of wireless communications of the first wireless node and the second wireless node.

28. The method of claim 27, wherein the transmitting is performed based at least in part on a configuration received from a central unit node of the integrated access and backhaul network.

29. The method of claim 27, wherein the indication of the association between the routing address and the discovery signal is transmitted by the second wireless node to the third wireless node or a different wireless node of the integrated access and backhaul network for providing the first wireless node with the routing address that is associated with the discovery signal.

* * * * *